US012449623B2

(12) United States Patent
Takisaki et al.

(10) Patent No.: US 12,449,623 B2
(45) Date of Patent: Oct. 21, 2025

(54) FIBER DISTRIBUTION SYSTEMS

(71) Applicant: Amphenol Network Solutions, Inc., Liberty Lake, WA (US)

(72) Inventors: Walter Dean Takisaki, Spokane Valley, WA (US); Greg Hilbert, Liberty Lake, WA (US); Bryan Joseph Kioski, Spokane, WA (US); Steven Kyle Witkoe, Liberty Lake, WA (US); Harley McAllister, Liberty Lake, WA (US)

(73) Assignee: Amphenol Network Solutions, Inc., Liberty Lake, WA (US)

( * ) Notice: Subject to any disclaimer, the term of this patent is extended or adjusted under 35 U.S.C. 154(b) by 222 days.

(21) Appl. No.: 18/307,675

(22) Filed: Apr. 26, 2023

(65) Prior Publication Data

US 2024/0361553 A1 Oct. 31, 2024

(51) Int. Cl.
*G02B 6/44* (2006.01)

(52) U.S. Cl.
CPC ....... *G02B 6/4452* (2013.01); *G02B 6/44526* (2023.05); *G02B 6/44528* (2023.05); *G02B 6/4457* (2013.01)

(58) Field of Classification Search
CPC .............. G02B 6/4452; G02B 6/44526; G02B 6/44528
See application file for complete search history.

(56) References Cited

U.S. PATENT DOCUMENTS

| 4,657,140 A | 4/1987 | Zagar et al. |
| 6,408,124 B1 | 6/2002 | Holman et al. |
| 7,715,679 B2 | 5/2010 | Kowalczyk et al. |
| 7,756,379 B2 | 7/2010 | Kowalczyk et al. |
| 7,873,253 B2 | 1/2011 | Smrha et al. |
| 7,894,701 B2 | 2/2011 | Kowalczyk et al. |
| 8,422,847 B2 | 4/2013 | Kowalczyk et al. |
| 8,494,333 B2 | 7/2013 | Kowalczyk et al. |
| 8,565,572 B2 | 10/2013 | Krampotich et al. |
| 8,705,929 B2 | 4/2014 | Kowalczyk et al. |
| 8,798,429 B2 | 8/2014 | Kowalczyk et al. |
| 8,805,153 B2 | 8/2014 | Rudenick et al. |
| 8,891,931 B2 | 11/2014 | Kowalczyk et al. |
| 8,938,147 B2 | 1/2015 | Krampotich et al. |

(Continued)

FOREIGN PATENT DOCUMENTS

KR 20030052674 A 6/2003

OTHER PUBLICATIONS

Search Report and Written Opinion for International Application No. PCT/US 24/25490, Dated Aug. 1, 2024, 10 pages.

*Primary Examiner* — Charlie Y Peng
(74) *Attorney, Agent, or Firm* — Lee & Hayes, P.C.

(57) ABSTRACT

A data communication apparatus includes a chassis. The chassis includes a front access side, a rear side, a rear wall disposed at the rear side, and a shelf extending at the rear side away from the front access side. A breakout module has a front end opposite a back end and is removeably disposable at least partially in the chassis. The breakout module includes a first adaptor disposed at the front end and a second adapter disposed in the back end. A cable module is removeably disposable on the surface of the shelf such that the cable module is not disposed in the chassis, the cable module including a spool configured to hold a fiber optic cable.

20 Claims, 15 Drawing Sheets

(56) References Cited

U.S. PATENT DOCUMENTS

| | | |
|---|---|---|
| 9,063,316 B2 | 6/2015 | Loeffelholz et al. |
| 9,170,392 B2 | 10/2015 | Krampotich et al. |
| 9,188,760 B2 | 11/2015 | Kowalczyk et al. |
| 9,341,802 B2 | 5/2016 | Krampotich et al. |
| 9,417,417 B2 | 8/2016 | Loeffelholz et al. |
| 9,448,377 B2 | 9/2016 | Kowalczyk et al. |
| 9,488,796 B2 | 11/2016 | Smrha et al. |
| 9,500,829 B2 | 11/2016 | Paula et al. |
| 9,523,834 B2 | 12/2016 | Kowalczyk et al. |
| 9,606,319 B2 | 3/2017 | Kowalczyk et al. |
| 9,664,871 B1 | 5/2017 | Galvan Mijangos et al. |
| 9,678,296 B2 | 6/2017 | Krampotich et al. |
| 9,690,066 B2 | 6/2017 | Smrha et al. |
| 9,841,575 B2 | 12/2017 | Lecoq |
| 9,885,846 B2 | 2/2018 | Kowalczyk et al. |
| 9,891,399 B2 | 2/2018 | Krampotich et al. |
| 9,995,898 B2 | 6/2018 | Krampotich et al. |
| 10,126,516 B1 | 11/2018 | Krampotich et al. |
| 10,203,465 B2 | 2/2019 | Krampotich et al. |
| 10,234,648 B2 | 3/2019 | Kowalczyk et al. |
| 10,247,897 B2 | 4/2019 | Kowalczyk et al. |
| 10,268,014 B2 | 4/2019 | Krampotich et al. |
| 10,359,590 B2 | 7/2019 | Haile-Mariam et al. |
| 10,488,612 B2 | 11/2019 | Gonzalez Covarrubias et al. |
| 10,606,015 B2 | 3/2020 | Kowalczyk et al. |
| 10,606,017 B2 | 3/2020 | Kowalczyk et al. |
| 10,627,593 B2 | 4/2020 | Krampotich et al. |
| 10,649,166 B2 | 5/2020 | Krampotich et al. |
| 10,712,518 B2 | 7/2020 | Kowalczyk et al. |
| 10,768,386 B2 | 9/2020 | Kowalczyk et al. |
| 10,884,211 B2 | 1/2021 | Krampotich et al. |
| 2008/0080825 A1* | 4/2008 | Leon .................. G02B 6/44526 385/135 |
| 2008/0292261 A1* | 11/2008 | Kowalczyk .......... G02B 6/4457 242/169 |
| 2009/0067800 A1 | 3/2009 | Vazquez et al. |
| 2010/0054685 A1* | 3/2010 | Cooke ................ G02B 6/44528 385/135 |
| 2012/0063735 A1* | 3/2012 | Nair ................... G02B 6/44528 385/135 |
| 2015/0268436 A1 | 9/2015 | Blackwell, Jr. et al. |
| 2015/0309277 A1 | 10/2015 | Krampotich et al. |
| 2015/0362092 A1* | 12/2015 | Grandidge .............. H04Q 1/06 29/428 |
| 2015/0370025 A1* | 12/2015 | Wells ................. G02B 6/44526 385/135 |
| 2017/0322384 A1 | 11/2017 | Burkett et al. |
| 2018/0088286 A1* | 3/2018 | Kostecka ............. G02B 6/3879 |
| 2019/0170959 A1 | 6/2019 | Krampotich et al. |
| 2021/0026091 A1 | 1/2021 | Kowalczyk et al. |
| 2021/0141184 A1 | 5/2021 | Krampotich et al. |

* cited by examiner

FIBER DISTRIBUTION SYSTEMS

BACKGROUND

An important consideration in data communication equipment is circuit density. Most central data communication locations have limited space. Therefore, there is a need to reduce the size of data communication equipment and install as much data communication equipment as possible in a relatively small space at a central data communication location.

For data communication manufacturers, making high density data communication apparatuses can be a challenging process in which engineers develop apparatuses to meet the high density needs of the central data communication locations while protecting communication lines, maintaining bend radii of the communication lines, and managing massive amounts of the communication lines. This is particularly true for optical fiber communication lines, where the engineers create apparatuses having a high density of optical fibers.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
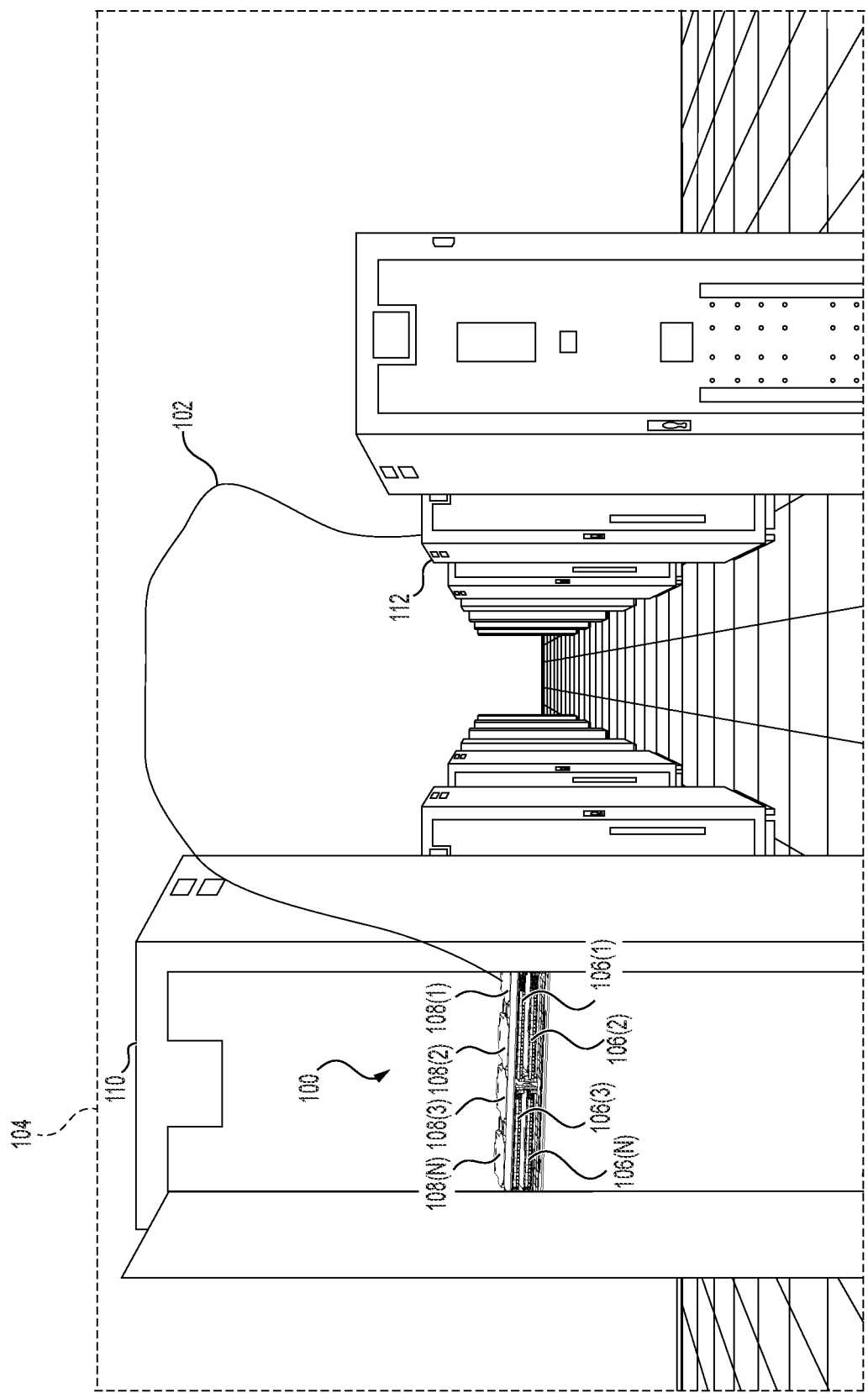
FIG. 1 illustrates an example data communication apparatus for cross-connecting fiber optic cables in a telecommunication facility according to an embodiment in this disclosure.

For the sake of clarity, unless otherwise defined hereinafter, the following words, if/when used in this disclosure, are intended to refer to portions, areas, regions, and/or directionalities of the device/features, as understood conventionally and according to the plain meaning of the words, with respect to the device/features described hereinafter, assuming the device/features are being considered in accordance with the presented orientation in the drawings and/or intended use: up, upward, above, down, downward, below, left, right, side, bottom, top, front, back, laterally, beneath, horizontally, vertically, lower, upper, outer, inner, etc. and other like terms. Moreover, such terms are included for the sake of clarity in describing the recited features as depicted in the orientations presented in the drawings.

This disclosure is directed to a removeably disposable cable module that is independent of a chassis in which it is implemented.

In an example situation of use, telecommunication cables (e.g., fiber optic cable, electrical cable, and/or hybrid cable that includes both electrical and optical conductors) may be cross-connected between multiple data communication apparatuses within a data communication facility (e.g., a datacenter, a cable plant, a headend, a distribution hub, a colocation data center, etc.). When cross-connecting fiber optic cables, a desired length of a fiber optic cable may be routed from the cable module to connect (e.g., couple, connect, join, plug, etc.), directly or indirectly, to a remote piece of telecommunication equipment. For example, a user may feed out a desired length of fiber optic cable from the cable module to connect panels located a distance from each other, without concern of the exact distance. Some examples of potential advantages associated with the cable module include: easily accessible and quick storage for amounts of extra cable thereby reducing the need to obtain additional cable (e.g., fewer order requests), minimized labor efforts, and reduced inventory management concerns.

While this application describes implementations that are described in the context of data communication apparatuses for cross-connecting optical fibers in a telecommunications facility, the implementations described herein may be used in other environments and are applicable to other contexts. For example, the data communication apparatuses may be located at any desired location, including overhead, below the floor, indoor or outdoor, at a workstation, at a desk, in a home, in an office, in an underground or above ground enclosure (including, e.g., pole-mounted or other areal enclosures), in a home theater, for use with a personal computer, with a personal workstation, with an audio system, in a vehicle, in a boat, etc. In addition, the data communication apparatuses may be used to connect a variety of elongated members other than optical fibers, such as wires, Ethernet cables, coaxial cables, power cords, wiring harnesses, etc.

FIG. 1 illustrates an example data communication apparatus 100 for connecting fiber optic cables 102 in a telecommunication facility 104. The data communication apparatus 100 may include one or more breakout modules, such as breakout modules 106(1), 106(2), 106(3), . . . , 106(N) and one or more cable modules, such as cable modules 108(1), 108(2), 108(3), . . . , 108(N). A user (e.g., a technician) may install the data communication apparatus 100 in the telecommunication facility 104 for cross-connecting the fiber optic cables 102 in the telecommunication facility 104. For example, a user may install the data communication apparatus 100 in a first cabinet 110 for telecommunication equipment and connect the fiber optic cable 102 to a second cabinet 112 for telecommunication equipment located a distance away from the first cabinet 110. For example, the fiber optic cable 102 from the cable module 108(1), or from any of the respective cable modules 108(2), 108(3), or 108(N) in the first cabinet 110, may be routed to the second cabinet 112, or any other cabinet.

Figure 2:
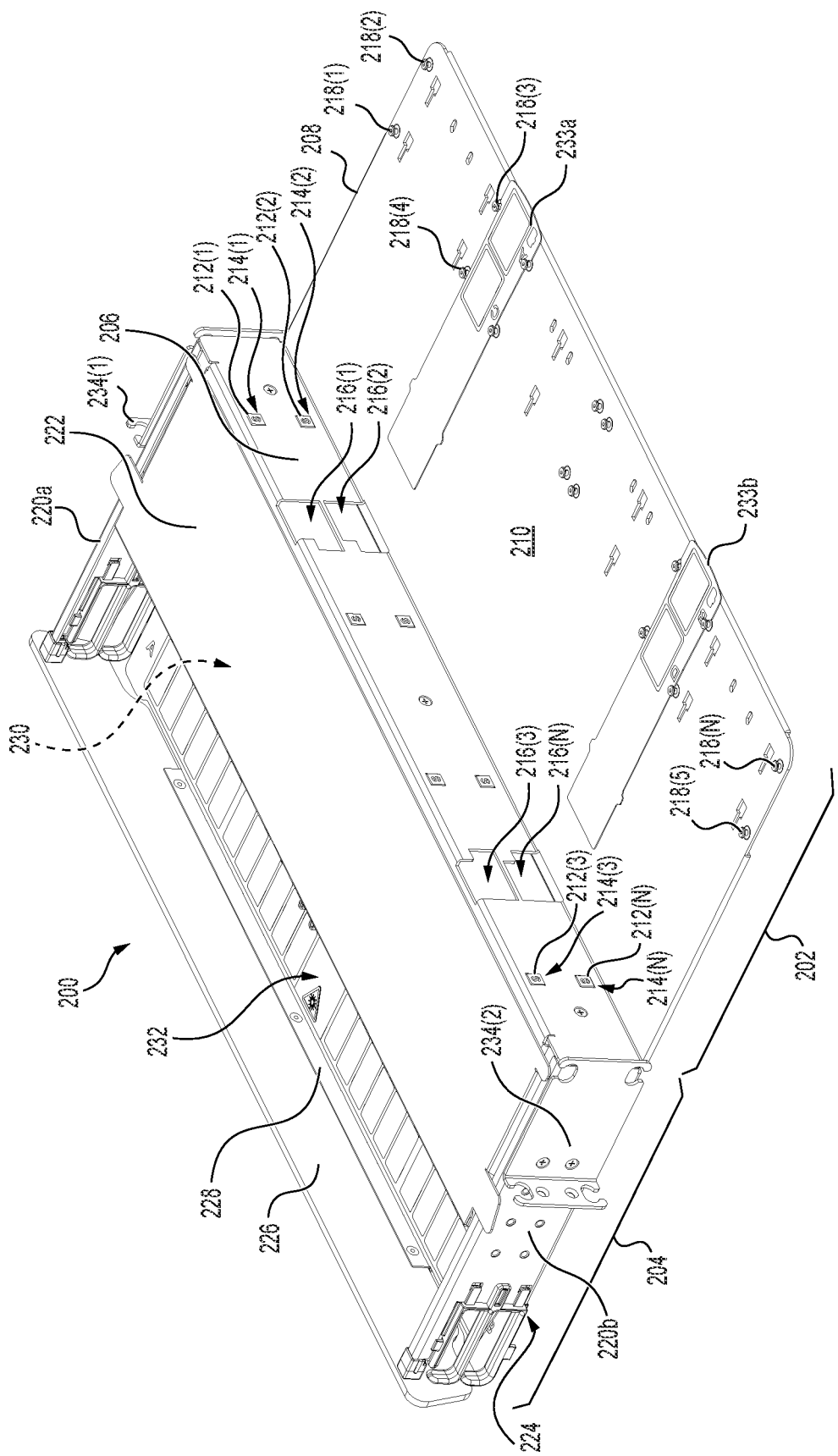
FIG. 2 illustrates a perspective view of a chassis and a shelf of the data communication apparatus of FIG. 1 according to an embodiment in this disclosure.

FIG. 2 illustrates a perspective view of a chassis 200 of the data communication apparatus 100 of FIG. 1. The chassis 200 is a base frame configured to support the one or more breakout modules 106(1)-106(N) and the one or more cable modules 108(1)-108(N). In an embodiment, the chassis 200 may be defined, at least in part, by a rear side 202 (i.e., the location which may be referred to by some in the industry as the "back bulkhead" side) opposite a front access side 204. A rear wall 206 (e.g., flange, partition, protrusion, separator, etc.) may extend vertically from side to side of the chassis 200 at the rear side 202.

In an embodiment, the with respect to the rear side 202, a shelf 208 may exist, extending away from a bottom of the rear wall 206 of the chassis 200. Moreover, as shown, a surface 210 of the shelf 208 may be substantially planar. In FIG. 2, the shelf 208 is depicted as substantially open (i.e., unenclosed; lacking sidewalls; substantially planar with exception for embodiments in which relatively small protruding features may be implemented on the surface 210, as discussed hereinafter, to secure cable modules thereto; etc.). Nevertheless, as described hereinafter, the open surface 210 of the shelf 208 facilitates placing one or more cable modules 108(1)-108(N) to be supported thereon. While FIG. 2 illustrates the shelf 210 as being one continuous shelf 208 that extends laterally from the rear wall 206 at the rear side 202, the surface 210 of shelf 208 may be formed of a plurality of shelves that extend laterally from the rear wall 206. For example, though not depicted as such, the data communication apparatus may include two, three, four, etc. respective shelves that are laterally spaced adjacent to each other and extend outward from and along the rear wall 206 at the rear side 202. In yet other embodiments, one or more of the cable modules 108(1)-108(N) may be supported on the shelf 210 while other cable modules 108(1)-108(N) are supported by something other than the shelf or are self-supported (e.g., supported due to a connection with the rear wall 206, for example, via one or more magnets 212(1)-212(N)).

In an embodiment, the rear wall 206 may be configured to connect to components, such as the one or more cable modules 108(1)-108(N) and/or the one or more breakout modules 106(1)-106(N), in a secure manner to hold the components securely to the chassis 200. Though multiple forms of secure engagement (e.g., connection) between the driving wall 206 of the chassis 200 and the components (i.e., the cable modules and the breakout modules) are considered possible, and may be alternatively implemented, the following description discusses the connection therebetween as the depicted embodiment of a magnetic connection.

Accordingly, in an embodiment, a magnetic connection may include one or more magnets, such as magnets 212(1), 212(2), 212(3), . . . , 212(N). The one or more magnets 212(1)-212(N) may be disposed with the rear wall 206 to magnetically couple to the breakout modules 106(1)-106(N) (not shown in FIG. 2, but see FIG. 3B and the description thereof) at the front access side 204 of the chassis 200. Likewise, the one or more magnets 212(1)-212(N) may also, or alternatively, be disposed with the rear wall 206 at the rear side 202 to magnetically couple to the cable modules 108(1)-108(N) (not shown in FIG. 2, but see FIG. 4B and the description thereof). For example, the cable modules 108(1)-108(N) may be removeably disposable on the surface 210 of the shelf 208 and the magnets 212(1)-212(N) may magnetically couple the cable modules 108(1)-108(N) to the rear wall 206 at the rear side 202. Thus, the one or more magnets 212(1)-212(N) may serve to connect both the breakout modules and the cable modules on opposite sides of the chassis 200 at the same time.

In alternative respective embodiments, the magnetic connection may be achieved between the various components (e.g., the chassis and the breakout modules and/or the cable modules) via the interactive force between a correspondingly located, magnetically attractive portion (e.g., a magnetically-attractive metal surface; a plastic or other suitable material surface, beneath which or within which, magnets or magnetic particles are disposed; etc.) at each of the component surfaces.

With further respect to the disposition and features of a magnetic connection, in an embodiment as depicted in FIG. 2, the magnets 212(1)-212(N) may be fixed in openings 214(1), 214(2), 214(3), . . . , 214(N) in the rear wall 206 of the chassis 200. For example, in an embodiment, the magnets 212(1)-212(N) may extend fixedly through the openings 214(1)-214(N) such that a first pole (e.g., a south pole or a north pole) of the magnets 212(1)-212(N) is exposed and faces toward the shelf 208 and a second pole (e.g., a south pole or a north pole) opposite the first pole of the magnets 212(1)-212(N) is exposed and faces toward the front access side 204 of the chassis 200. In an alternative embodiment (not shown), instead of being fixed in the openings 214(1)-214(N), the magnets 212(1)-212(N) may be fixed directly to the front and/or back surfaces of the rear wall 206. In some embodiments, the rear wall 206 includes one or more magnets 212(1)-212(N) while the breakout modules and the cable modules do not include magnets. In other embodiments, the breakout modules and the cable modules include magnets while the rear wall 206 does not include magnets. In yet other embodiments, the breakout modules, the cable modules and the rear wall 206 include magnets.

As indicated above, while FIG. 2 illustrates an embodiment of a magnetic connection associated with the rear wall to magnetically couple to the cable modules and/or the breakout modules, other types of connections are contemplated. For example, the connection manner between the rear wall of the chassis and the cable modules and/or the breakout modules may be achieved via one or more of: snap features, snap-fit connections, press-fit connections, connectors, hook and loop, multiple-use adhesive, etc., and further including other now known and/or currently unknown, but equally applicable, connection means to releasably, or non-releasably (if desired), connect the components to the chassis.

Additionally, in an embodiment, the rear wall 206 of the chassis 200 may include one or more apertures 216(1), 216(2), 216(3), . . . , 216(N) therethrough. The apertures 216(1)-216(N) are sized and shaped to accommodate extension members (not shown in FIG. 2) of the breakout modules 106(1)-106(N) to extend through the apertures 216(1)-216(N) from the front access side 204 to extend to the shelf 208. While FIG. 2 illustrates four apertures 216(1)-216(N) located in the rear wall 206, as indicated above, the rear wall 206 may include fewer than four apertures or more than four apertures.

In an embodiment, the shelf 208 may include one or more guide members 218(1), 218(2), 218(3), 218(4), 218(5), . . . , 218(N). The guide members 218(1)-218(N) may be located on the surface 210 of the shelf 208 to guide the cable modules 108(1)-108(N) into position on the surface 210 of the shelf 208. In an embodiment, the guide members 218(1)-218(N) may include features that are oriented and disposed on the shelf 208 in positions to align and/or engage to assist in securing the cable modules 108(1)-108(N) in place via corresponding features to interface therewith. For example, in an embodiment, the guide members 218(1)-218(N) may include: posts that protrude upward from the surface 210 of the shelf 208, which posts may be disposed in positions to engage and align with corresponding structural features (i.e., correspondingly shaped grooves that accommodate the posts therein) on the adjacent surfaces of the cable modules. In alternative embodiments not shown, the guide members may include features such as: grooves (e.g., gaps, channels, etc.) in the surface of the shelf, flanges that protrude from the shelf; ramps disposed on the shelf, etc.

With respect to additional aspects and features of the front access side 204, the front access side 204 may be at least partially enclosable. In an embodiment, the front access side 204 may include a pair of sidewalls 220a, 220b that extend from opposite ends of the rear wall 206, respectively, along opposing sides of the chassis 200. Further, a top plate 222 may be disposed at the top edges of the sidewalls 220a, 220b and the top of the rear wall 206 (as shown in FIG. 2, for example), and a bottom plate 224 (not visible in FIG. 2, but see FIGS. 7B and 8B) may be incorporated on a side of the chassis 200 opposite the top plate 222, to provide a base of the front access side 204. That is, the bottom plate 224 may define a base of the partial enclosure in connection with the bottom edges of the sidewalls 220a, 220b and the rear wall 206, so as to extend substantially adjacent and coplanar with the shelf 208.

Additionally, in an embodiment, the front access side 204 may include a door 226 to enclose the front end of the front access side 204. For example, the door 226 may be pivotally attached via a hinge 228 along an edge of the bottom plate 224 of the front access side 204, as shown in FIG. 2. As such, when in use, the door 226 may be folded upward to enclose and protect any components within the front access side 204, or the door 226 may fold downward against a front of the rack to which the chassis 200 is installed, thereby facilitating user access and minimizing interference with the access. Alternatively, the door 226 may connect to the front access side 204 via other means (and/or at other locations on the front access side 204), including: magnetic attraction, a snap fit, a compression fit, a hook and catch, a latch mechanism, hook and loop material, reusable adhesive, etc.

Figure 8A:
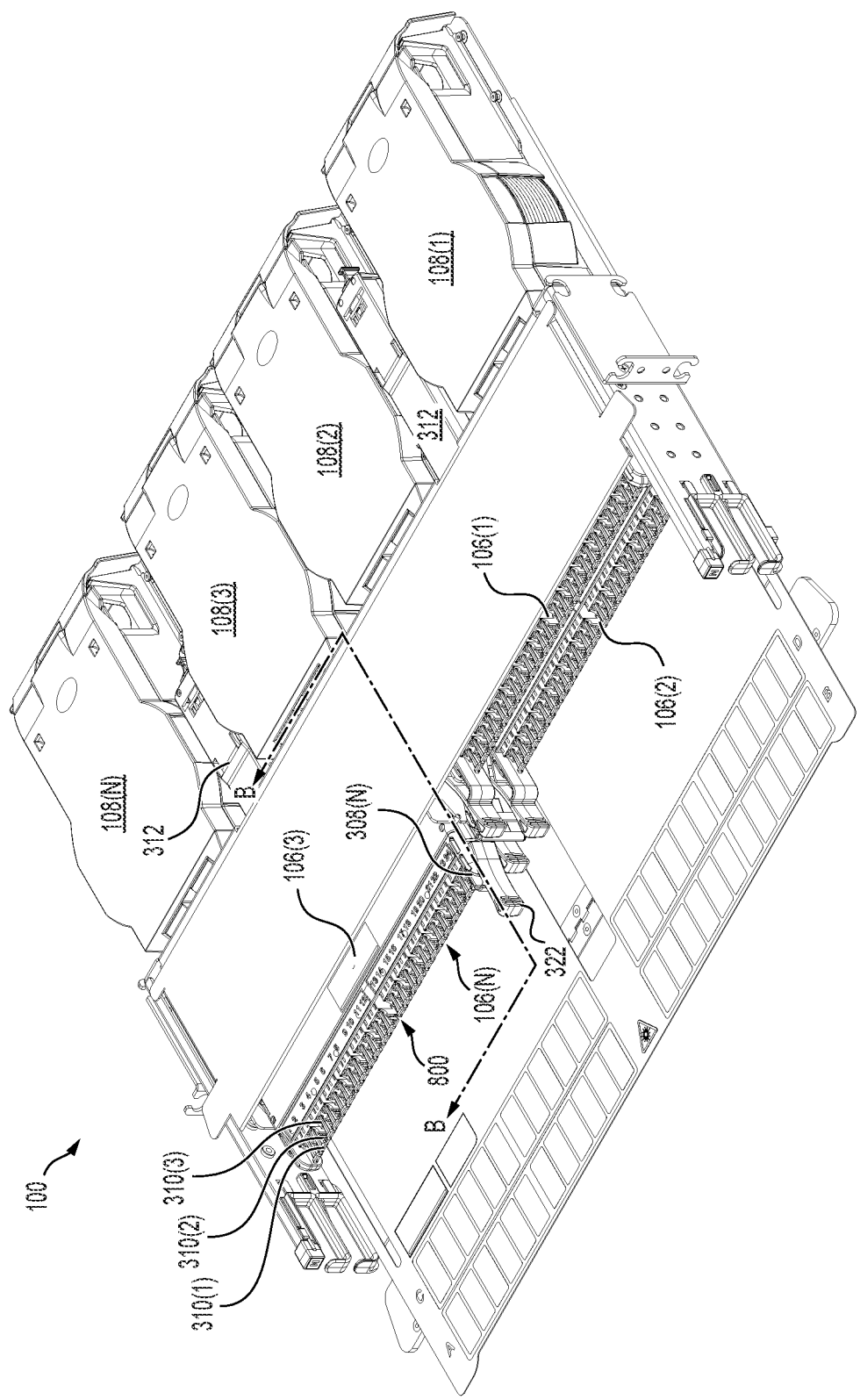
FIGS. 8A-B collectively illustrate a breakout module in an access position according to an embodiment in this disclosure.
Figure 8B:
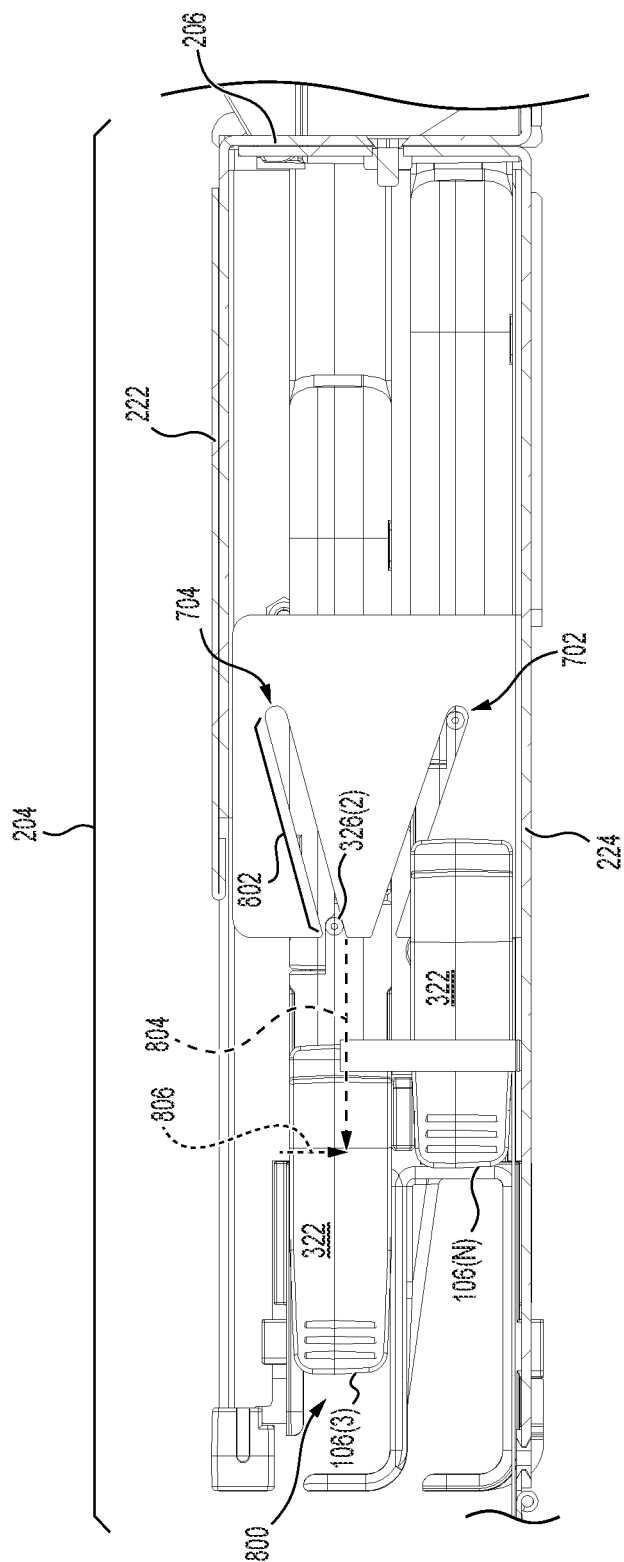
Figure 9:
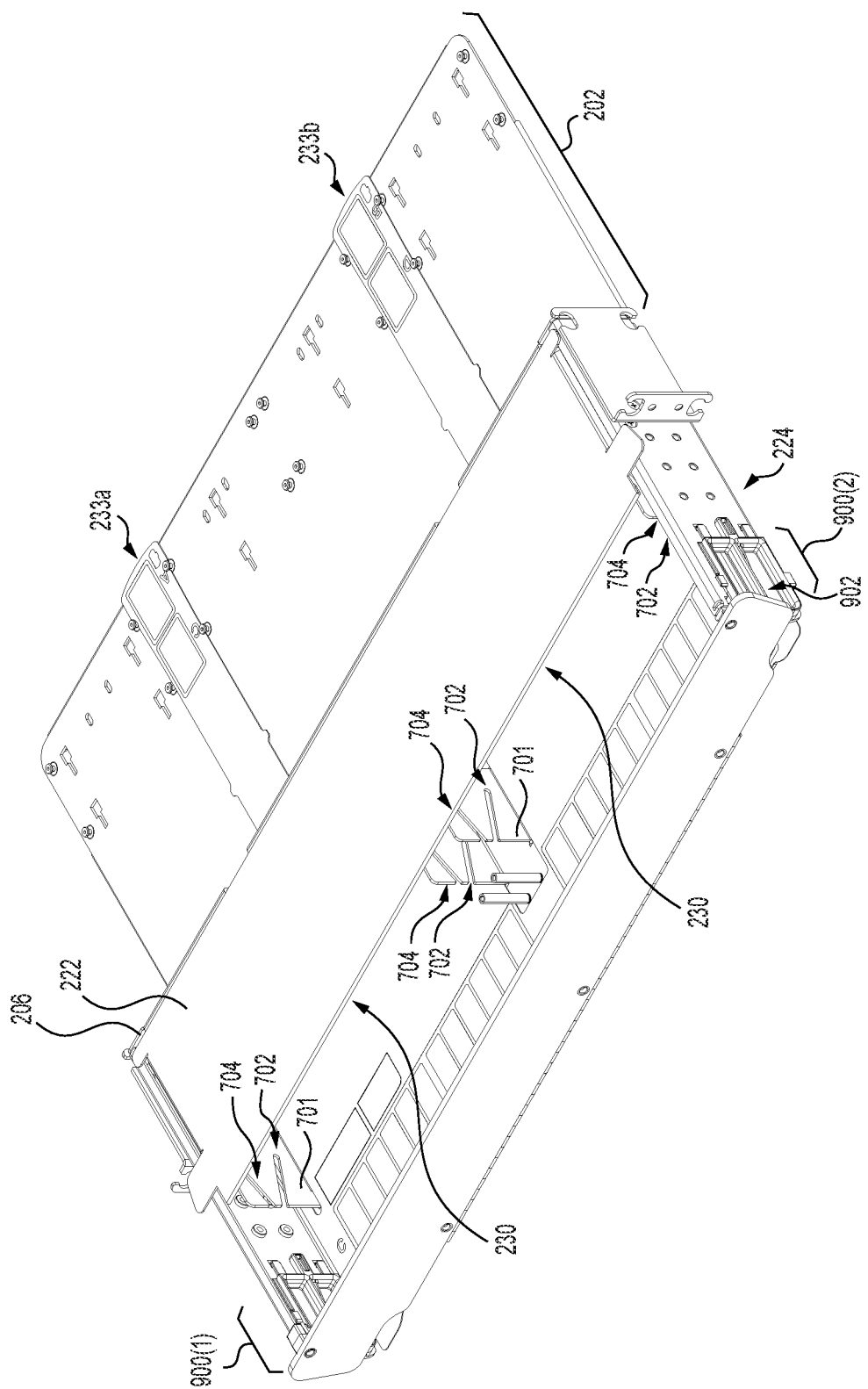
FIG. 9 illustrates a perspective view of the chassis and the shelf of the data communication apparatus of FIG. 1 according to an embodiment in this disclosure.

Therefore, in an embodiment as shown in FIG. 2, where the top plate 222 does not extend all the way from the rear wall 206 to the door 226, when closed (in the upright position), the arrangement of the sidewalls 220a, 220b with the top plate 222 and the bottom plate 224 of front access side 204 form a partially enclosed pocket 230 (see also FIG. 9). Moreover, the pocket 230 is sized to accommodate the one or more breakout modules 106(1)-106(N) therein (not shown in FIG. 2, but see FIGS. 6A-8B).

In an embodiment, the front access side 204 may further include a designation card 232 used to facilitate management of the optical fibers (or other cables routed therein). Moreover, the designation card 232 may be located in alignment with the bottom plate 224. Similarly, the shelf 208 may include designation cards 233a, 233b used to facilitate management of the optical fibers (or other cables routed therein). Moreover, the designation cards 233a, 233b may be located in alignment with the shelf 208. The designation cards 232, 233a, 233b are described in greater detail hereinafter with respect to FIGS. 6A and 6B.

Additionally, the chassis 200 may further include brackets 234(1) and 234(2) disposed, respectively, on an outer surface of the sidewalls 220a, 220b of the front access side 204. In an embodiment, the brackets 234(1), 234(2) may be L-shaped to pair a portion with the sidewalls 220a, 220b while the other portion of the L-shape extends outwardly to connect to a rack. Thus, the brackets 234(1), 234(2) are positioned to mount the chassis 200 to a rack (not shown in FIG. 2), such as a 19-inch rack, which is a standard size rack in the industry. Moreover, inasmuch as the chassis 200 may be installed in racks which may not be exactly the same across the industry, the brackets 234(1) and 234(2) may be configured according to the particular circumstances. For example, the brackets 234(1) and 234(2) may have one or more structural features such as slots, protrusions, etc. that correspond to the particular rack to which the chassis 200 is installed. In some embodiments, the brackets 234(1) and 234(2) may have one or more structural features such as slots, protrusions, etc. that correspond to a plurality of racks.

Figure 3A:
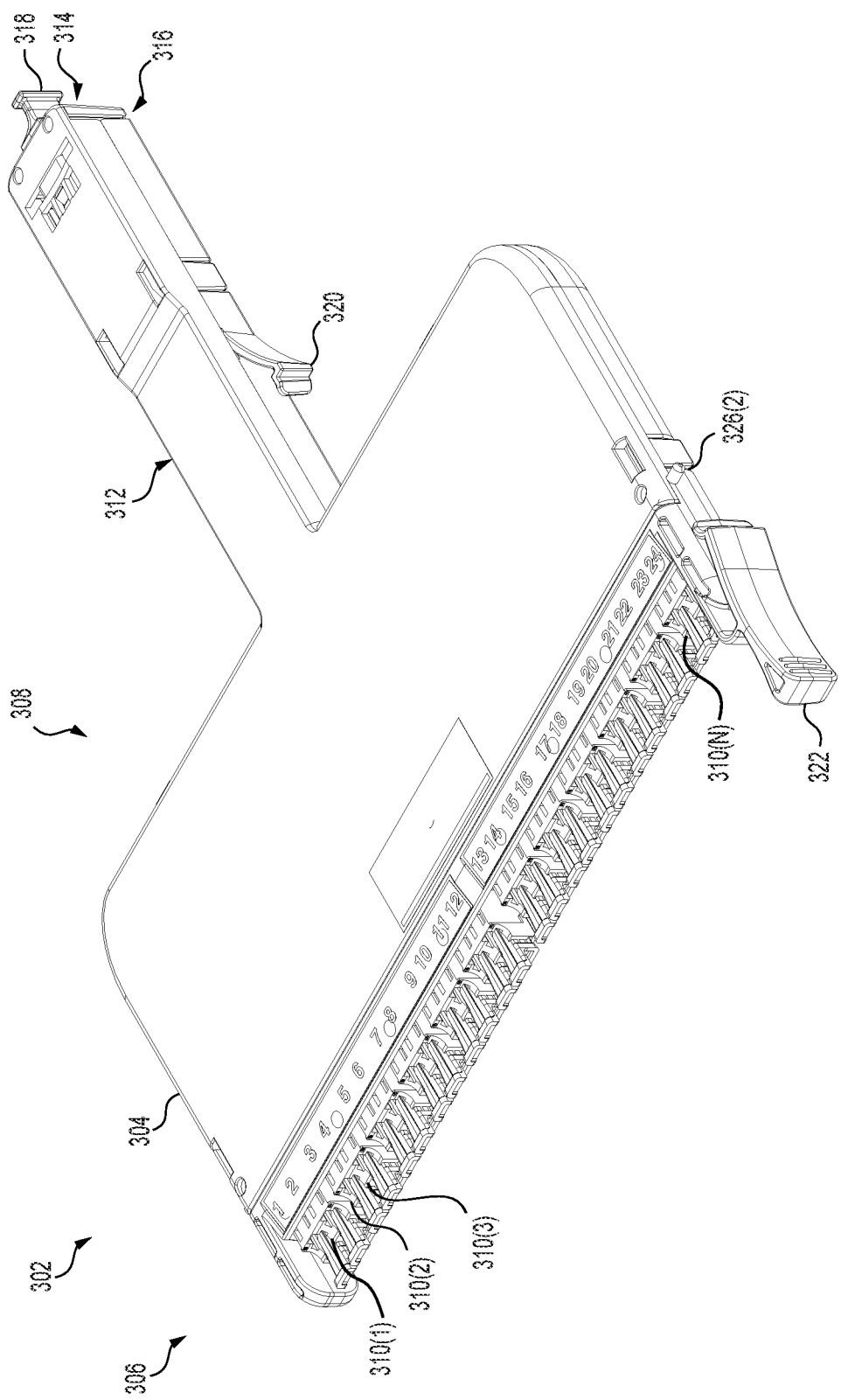
FIGS. 3A-B collectively illustrate perspective views of a breakout module according to an embodiment in this disclosure.
Figure 3B:
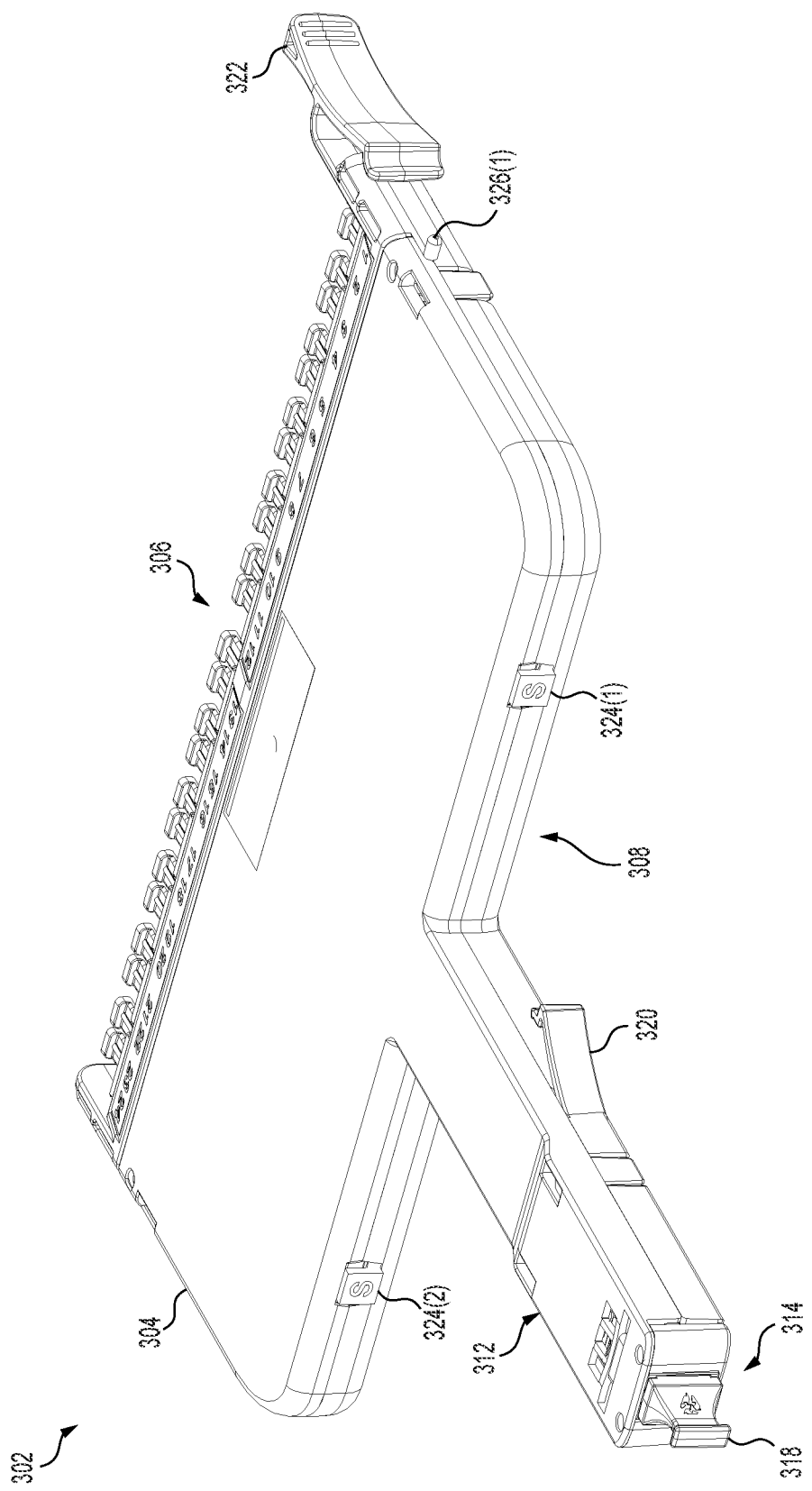

FIGS. 3A and 3B respectively illustrate front and back perspective views of a breakout module 302, which are examples of the breakout modules 106(1)-106(N). The breakout module 302 may include a housing 304 having a front end 306 (e.g., first end, user-facing end, etc.) opposite a back end 308 (e.g., second end, chassis-facing end, etc.). The breakout module 302 is configured to be removeably disposable at the front access side 204 of the chassis 200. The housing 304 may have a T-shaped configuration profile, as depicted. However, it is contemplated that in alternative embodiments not shown, the shape of the profile of the breakout module may be other shapes such as triangular, L-shaped, bulb-shaped, etc.

Further, the breakout module 302 may include adaptors 310(1), 310(2), 310(3), . . . , 310(N) (e.g., adaptors receive connectors that hold fibers) for distributing and routing communication capabilities of any variety known or not yet created, where such connector receptacles are suitably implemented herein. For example, in an embodiment, the connector receptacles 310(1)-310(N) may be configured to receive any suitable type of connector, such as but not limited to: straight tip connectors (ST), ferrule core connectors (FC), mechanical transfer registered jack connectors (MT-RJ), Lucent Connectors (LC), standard/subscriber connectors (SC), dual SC, MMC connectors, etc. The adaptors 310(1)-310(N) are disposed at the front end 306 of the breakout module 302.

While FIGS. 3A-3B illustrate the breakout module 302 configured with connectors for patching optical fibers, the breakout module is versatile and may be configured with other compatible components for different purposes. For example, a breakout module may be configured with components for splicing optical fibers. Moreover, while FIGS. 3A-3B illustrate the breakout module having one row of connectors with a total of 24, the breakout module may have more or less than 24 connectors. In other embodiments, the breakout module may have two or more rows of connectors and a total of more or less than 24 connectors. Moreover, some of the connectors may be used for pass-through, testing, spacing, etc.

In an embodiment, the breakout module 302 may include an extension member 312. The extension member 312 extends from the back end 308 of the breakout module 302. More specifically, the extension member 312 is configured such that, when placed in the chassis 200, the extension member 312 extends through a correspondingly located aperture of the apertures 216(1)-216(N) in the rear wall 206 of the chassis 200 and extends over the shelf 208. The breakout module 302 may further include one or more adapters 314 disposed in an end 316 of the extension member 312. For example, the one or more adapters 314 may include MPO adapters (e.g., a Multi-fiber Push On adapters). When the adapters 314 are not being utilized, a plug 318 may be inserted into an opening located in the end 316 of the extension member 312.

In an embodiment, the breakout module 302 may further include a latch member 320 configured to stop the breakout module 302 from being unintentionally completely removed from the chassis from the chassis 200. The latch member 320 may be fixed to the extension member 312. In an embodiment, as depicted, the latch member 320 may include a spring-hinge protrusion with a hooked end, where the protrusion is hingeably connected to the extension member 312. The hooked end of the latch member 320 may extend away from the extension member 312 and toward the front end 306 of the breakout module 302. Thus, when the breakout module 302 is placed into the chassis 200, the latch member 320 may flap or hinge inwardly toward the body of the extension member 312 and pass easily through the corresponding aperture (216(N), for example), and once through the aperture, the latch member 320 springs resiliently outward away from the extension member 312. Accordingly, a user may begin to displace the breakout module 302 from a stowed position to an access position (discussed in more detail below with regard to FIGS. 7A-B, and FIGS. 8A-8B) by pulling the breakout module 302 away from the rear wall 206. However, upon pulling, the latch member 320 (in the outward sprung position) may come into contact with the rear wall 206 adjacent to the aperture (216(N)) such that the breakout module 302 is prevented from complete unintentional removal.

While FIGS. 3A-3B illustrate the latch member 320 as a spring-hinge protrusion, in alternative embodiments not shown, the latch member may include: a protruding flap, a detent disposed in the extension member; a ball and spring mechanism disposed with the extension member; a ridge that rises from the extension member; a magnetic connection, etc.

Additionally, in an embodiment, the breakout module 302 may include a handle 322 to facilitate extraction and insertion into the pocket 230 of the front access side 204. As shown, the handle 322 may be fixed to the front end 306 of the breakout module 302. Further, the handle 322 may be disposed at a lateral side edge at the front end 306 of the breakout module 302. In an embodiment, the handle 322 may be hingeably connected to the breakout module 302 and protrude from the front end 306 of the breakout module 302 to be easily grasped by a user. A user may grasp the handle 322 to displace the breakout module 302 between the stowed position and the access position. Though not shown, it is considered that the handle 322 may include structural features (e.g., gates, posts, ramps, troughs, apertures, etc.) that assist in managing the cables. Moreover, while FIGS. 3A-B illustrate a single handle 322, it is considered that a second handle (not shown) may be fixed to the opposite lateral side edge of the front end 306 of the breakout module 302, or in another location thereon. That is, for example, though not shown, the breakout module 302 may include left and right handles fixed to opposing lateral sides of the front end 306 of the breakout module 302.

In an embodiment, the breakout module 302 may couple to the rear wall 206, as indicated above, via a plurality of means. For example, as depicted in FIG. 3B, the breakout module 302 may include a magnetically attractive portion, such as magnets 324(1) and 324(2), which correspond in position in the back end 308 of the breakout module 302, to respectively aligned magnets 212(1)-212(N) at the rear wall 206. Thus, when the breakout module 302 is inserted in the chassis 200, the breakout module 302 may magnetically couple to rear wall 206. Such a coupling may further prevent unintentional displacement when a user (e.g., a technician) cleans the adapters 314 disposed in the end 316 of the extension member 312.

Additionally, the breakout module 302 may include guide members 326(1) and 326(2). As shown in FIG. 3B, the guide members 326(1) and 326(2) may include protrusions, bumps, pins, etc. that are located on the sides of the breakout module 302. The guide members 326(1) and 326(2) may be slidably received by guides in the chassis 200 (not shown in FIGS. 3A-B). As such, the guide members 326(1) and 326(2) are configured to guide the breakout module 302 between the stowed position and the access position.

Figure 4A:
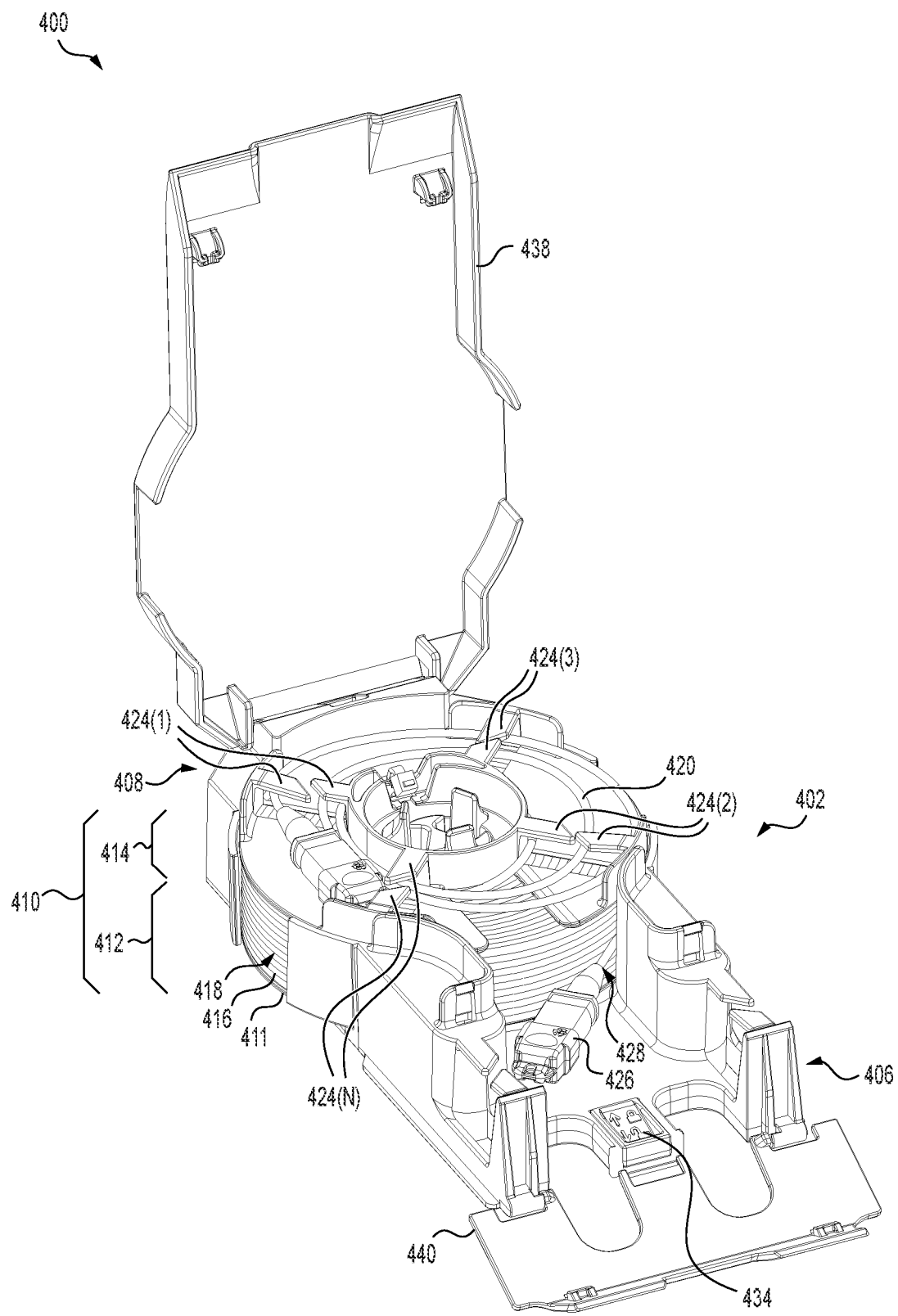
FIGS. 4A-C collectively illustrate perspective views of a cable module according to an embodiment in this disclosure.
Figure 4B:
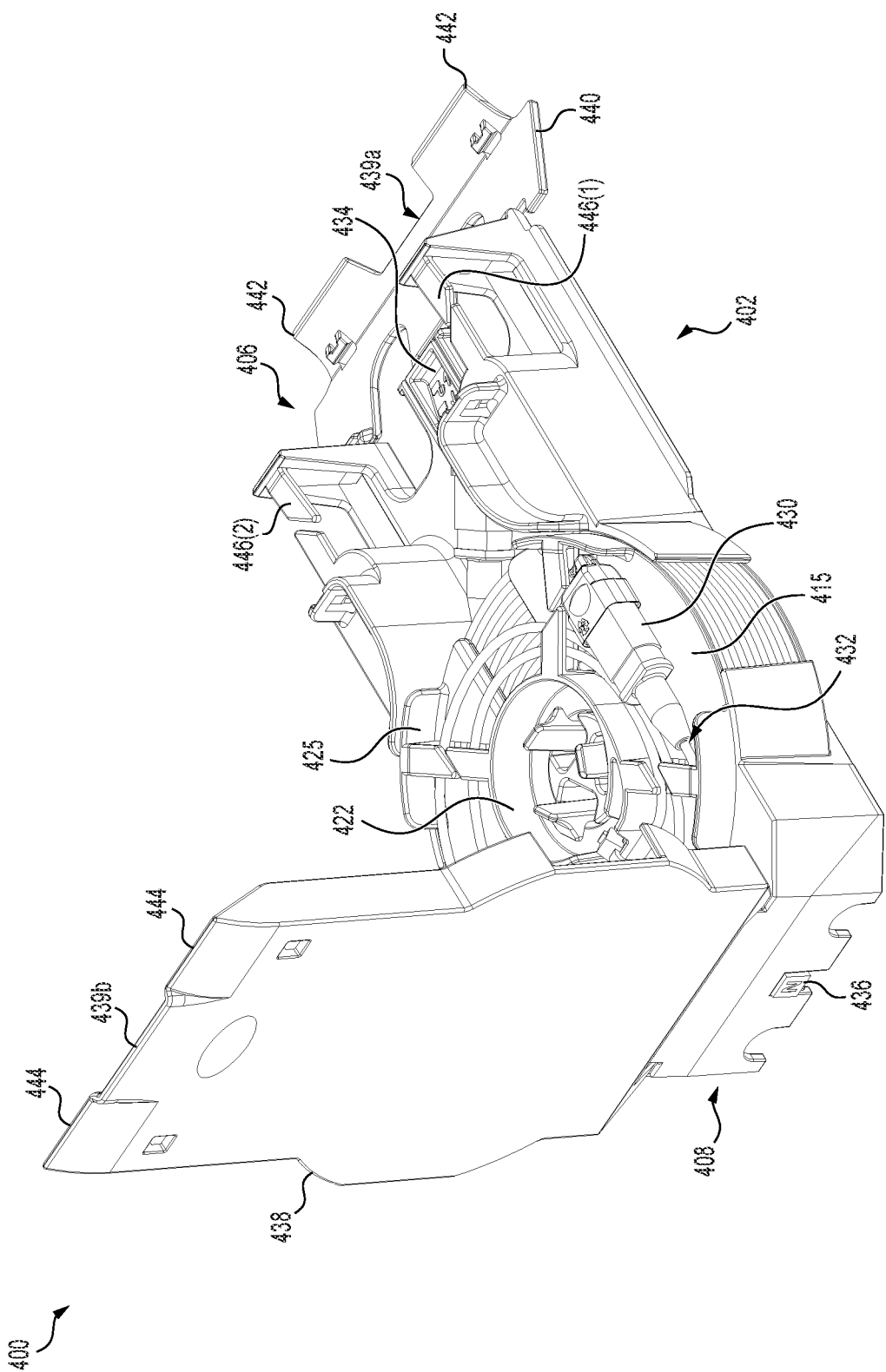
Figure 4C:
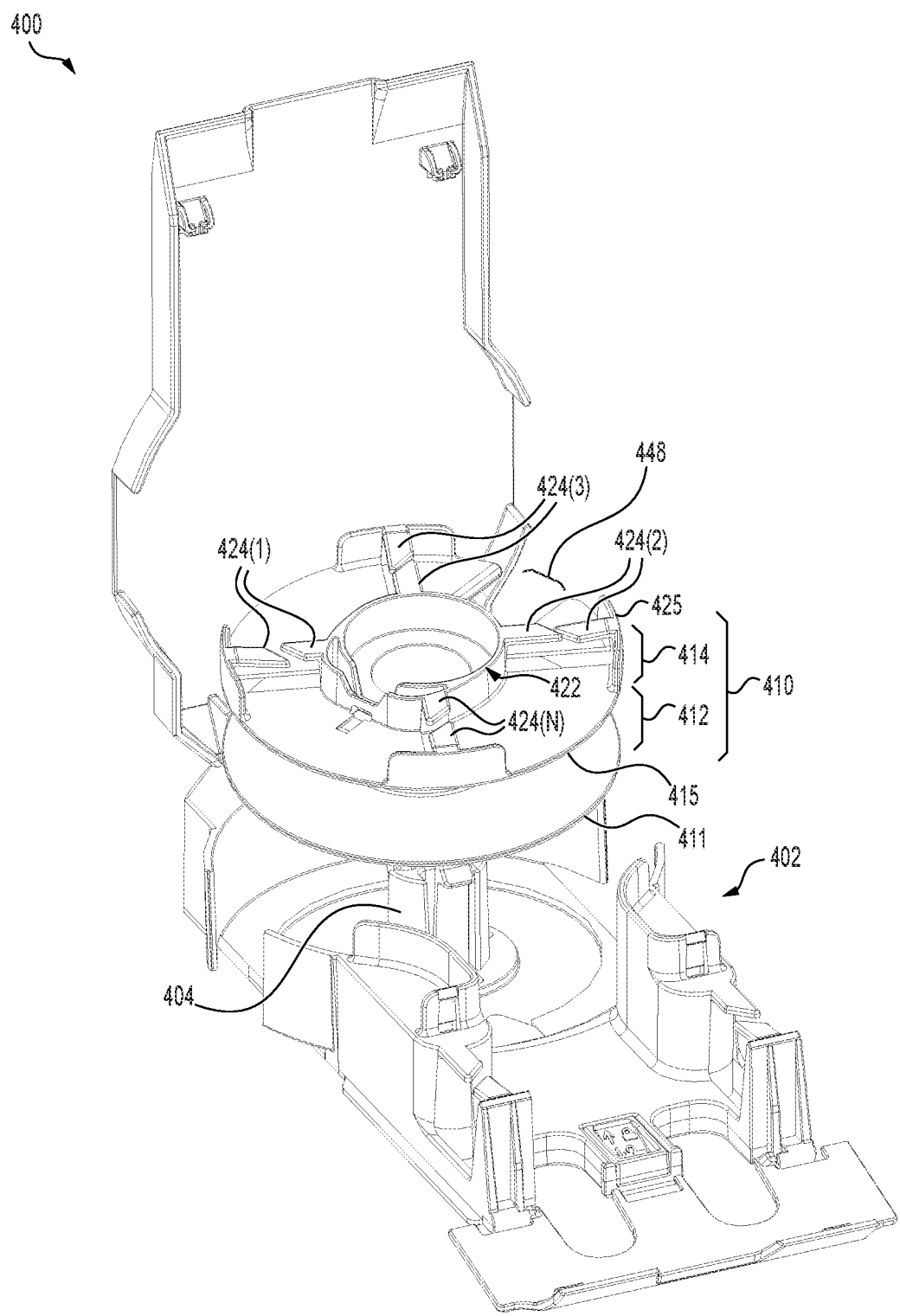

FIGS. 4A and 4B respectively illustrate front and back perspective views of a cable module 400, and FIG. 4C illustrates an exploded perspective view thereof. The cable module 400 is an example of the cable modules 108(1)-108(N) of the data communication apparatus 100 of FIG. 1. Though the cable module 400 may be removeably disposed on the surface 210 of the shelf 208, it is considered that the cable module 400 is independent of the chassis 200. The cable module 400 may include a housing 402 (e.g., clamshell, frame, support carriage, etc.) with a spool axis 404 disposed therein (see FIG. 4C). For the purpose of defining the parts, the housing has a front end 406 (e.g., first end, user-facing end, etc.) opposite a back end 408 (e.g., second end, chassis-facing end, etc.), and is shaped and sized to house a spool 410 rotatably disposed about the axis 404 in the housing 402.

In an embodiment, the spool 410 may include a spool base plate 411 that supports a cable, such as a fiber optic cable. The spool 410 may have a first portion 412 defined adjacent the spool base plate 411, and a second portion 414 define vertically above the first portion 412. Moreover, the second portion 414 may be spatially separated from the first portion 412, at least in part by a divider 415, (which is described in greater detail hereinafter). Thus, the spool 410 is configured to hold a first segment 416 of a cable 418 wound around the first portion 412 of the spool 410, and a second segment 420 of the cable 418 wound around the second portion 414 of the spool 410.

Notably, the cable 418 may be sized in length to any desirable length depending on a size of the outside diameter of the cable, which may vary. That is, the fixed size (including outer diameter and height, as well as the diameter of the central axial support around which cable may be wound) of a particular spool may accommodate a range of lengths of cable depending on the diameter of the cable. Thus, a smaller diameter cable permits additional length, while a larger diameter cable will reduce the amount of length the same spool could accommodate. For example, in an embodiment, a spool 410 (as contemplated for implementation in the circumstances associated with the instant disclosure) carrying a full load of cable may be sized to accommodate a range of cable length of 20 ft to 150 ft, depending on the diameter of the cable which may range from 1.5 mm to 4 mm. Alternatively, a cable having a diameter measured in microns (e.g., 50 microns-100 microns) may permit a spool to carry a length of cable that is greater than 150 ft; and a cable having a diameter measured in mm (e.g., 1 mm-5 mm or larger) may permit a spool to carry a length of cable that is less than 150 ft. Nevertheless, the amount to be provided depends on at least the size of the spool and the diameter of the selected cable, as well as user and business preferences, economics, needs, etc.

In an embodiment, the spool 410 further includes an axial support structure 422 (e.g., an axially aligned cylindrical wall, visible in the second portion 414) about which the cable 418 is wound in the respective first portion 412 and the second portion 414. Additionally, the axial support structure 422 interconnects the first portion 412 to the second portion 414, from the spool base plate 411 to the divider 415.

The spool 410 holds the first segment 416 of the cable 418 wound around the first portion 412 of the spool 410 to be able to feed at least a portion of the first segment 416 of the cable 418 out of the housing 402 to a piece of telecommunication equipment. In contrast, the spool 410 may hold the second segment 420 of the cable 418 in the second portion 414 via cable guide/s to provide strain relief. For example, in an embodiment, the cable guide/s of the spool 410 may include one or more pairs of opposing flanges 424(1), 424(2), 424(3), . . . , 424(N). The respective opposing flanges of each pair of opposing flanges 424(1)-424(N) extend laterally toward each other, one from a top edge of the axial support structure 422 in the second portion 414, and the other extending from the top edge of an outer support wall 425 that protrudes from the outer perimeter of the divider 415 in the second portion 414. Moreover, the one or more pairs of opposing flanges 424(1)-424(N) may assist in routing and/or containing the cable 418 with a minimum bend radius in the second portion 414, when the first segment 416 of the cable 418 is unreeled out of the housing 402.

Additionally, each pair of opposing flanges 424(1)-424(N) extends toward each other, above the fiber optic cable 418 and may not touch in the middle as there is an angled gap therebetween. The gap may be sized to allow a single width of cable 418 to pass therethrough. In an embodiment, the one or more pairs of opposing flanges 424(1)-424(N) may be planar and/or may be flexible to prevent damaging the cable 418 when the cable 418 passes through the gap between a pair of opposing flanges.

While FIGS. 4A-4C illustrate the features providing strain relief as the one or more pairs of opposing flanges 424(1)-424(N), the features that assist in providing strain relief may alternatively include posts, ramps, troughs, apertures, etc.

A first connector 426 may be attached to an end 428 of the first segment 416 of the fiber optic cable 418. The first connector 426 may be configured to connect to a piece of telecommunication equipment. A second connector 430 may be attached to an end 432 of the second segment 420 of the cable 418. The second connector 430 may be configured to connect to the adapter 314 disposed in the end 316 of the extension member 312.

In an embodiment, the spool 410 may incorporate a locking mechanism to control the rotation thereof. For example, a tab 434 may be slidably disposed in the housing 402 of the cable module 400—and may be slidable between a locked position and an unlocked position to lock or unlock the spool 410 in either a position of free rotation or suspension from movement. The lockability of the spool 410 is discussed in more detail below with regard to FIG. 5.

Additionally, the cable module 400 may be configured to releasably couple to the rear wall 206 of the chassis 200 on the rear side 208. Notably, it is contemplated that many forms of mechanical force connection are possibilities. However, for the sake of conciseness, the description describes an embodiment as an exemplary manner of coupling between the cable module 400 and the rear wall 206.

Accordingly, FIG. 4B illustrates an embodiment in which the cable module 400 may couple via a magnetic portion, such as a magnet 436. The magnet 436 may be located in the back end 408 of the housing 402 of the cable module 400. The magnet 436 may positioned specifically to align with and magnetically couple to a respective one of the magnets 212(1)-212(N) disposed with the rear wall 206 on the chassis 200.

Furthermore, in an embodiment, the cable module 400 may include a lid 438. The lid 438 may be pivotably attached to the back end 408 of the housing 402 of the cable module 400. The lid 438 is hinged to be displaced between an open position, granting access to the cable 418, and a closed position, covering a top side of the housing, to avoid inadvertent access to or contact with the features (e.g., cable 418) in the housing 402.

In an embodiment, the cable module 400 may further include a door flap 440. The door flap 440 may be pivotably attached to the base (e.g., bottom edge) of the front end 406 of the housing 402 of the cable module 400. Similar to the lid 438, the door flap 440 may be hinged to be displaced between an open position (FIGS. 4A, 4C) and a closed position (see FIG. 6A in which the cable module 400/108(N) is closed and is connected to the chassis 200). The door flap 440 is shaped, at least in part, to enclose the front end 406 between the bottom and the top of the housing 402. Further, when both the lid 438 and the door flap 440 are in the closed positions, respectively, the free edge 439a of the door flap 440 (i.e., opposite the hinged edge) meets the free edge 439b of the lid 438. Thus, when the door flap 440 is opened and the lid 438 is closed, a user may access the first connector 426 and/or the tab 434 inside the housing 402 without having to open the lid 438 and thereby limiting exposure of the bulk of the cable 418 and other structural elements. Moreover, in an embodiment, the door flap 440 may further include one or more flanged arms 442 that protrude from opposing ends of the free edge 439a of the door flap 440. The flanged arms 442 extend in a direction that is transverse to the plane of the body of the door flap 440. Accordingly, in an embodiment with the one or more flanged arms 442, upon closing the door flap 440 with an upward swinging action, the one or more flanged arms 442 may overlap one or more correspondingly-located portions 444 of the free edge 439b of the lid 438, such that the lid 438 is further secured in place over the housing 402.

In an embodiment, the cable module 400 may further include cable guides 446(1) and 446(2) disposed near the front end 406 that route and/or maintain the cable 418 with a minimum bend radius as the first segment 416 of the cable 418 is unreeled out of the housing 402. A user may route and/or maintain the cable 418 in either one of the cable guides 446(1) or 446(2) depending on which side of the housing 402 the fiber optic cable 418 needs to be routed. Like the cable guides described above (i.e., 424(N)), in an embodiment, the cable guides 446(1), 446(2) may include a pair of opposing flanges extending toward each other, with a gap therebetween, from opposing wall portions at the front end 406 of the housing 402. Additional aspects of the cable guides 446(1), 446(2) may be similar or the same as those described above with respect the pairs of opposing flanges 424(1)-424(N).

FIG. 4C illustrates the spool 410 in an exploded view from the housing 402 and without the cable 418 to clearly show the spool 410 being partitioned into the first portion 412 (e.g., a lower portion) and the second portion 414 (e.g., an upper portion). As indicated above, the first portion 412 may be separated spatially from the second portion 414 by the divider 415. The divider 415 may be considered to be a semi-continuous divider because there may be a gap 448 (e.g., a discontinuity in the plane of the divider) where the cable 418 may pass through to continue to be spooled above the divider 415, thereby being wrapped separately from the first segment 416. Note, the combined height of the first portion 412 and the second portion 414 makes up a total height of the spool 410.

Figure 5:
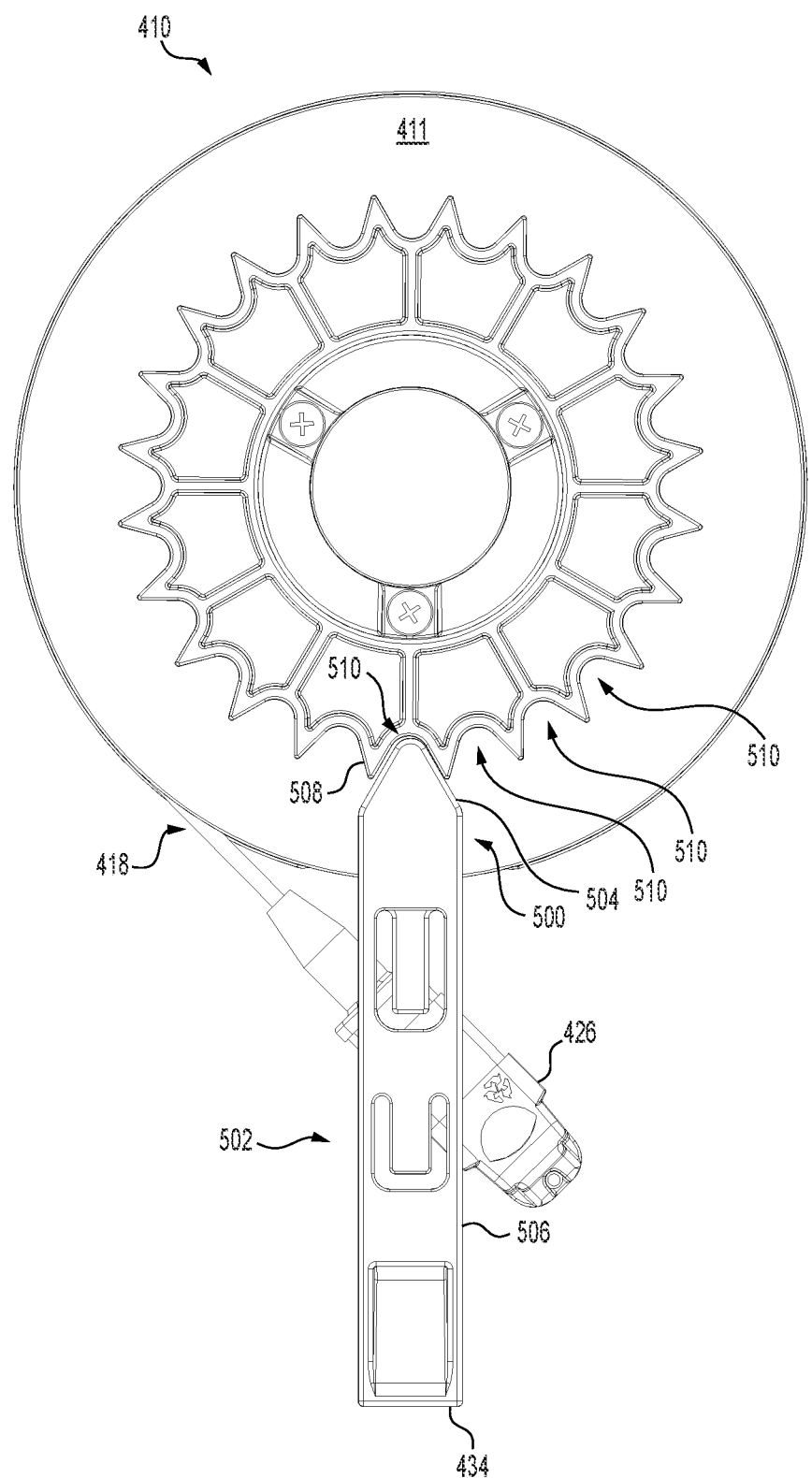
FIG. 5 illustrates a bottom view of a spool according to an embodiment in this disclosure.

FIG. 5 illustrates a bottom view of the spool base plate 411 of spool 410 mentioned earlier with respect to FIGS. 4A-B, as well as beneath the housing 402 (which is removed for clarity). As indicated above, FIG. 5 illustrates a locking mechanism 500 that may be included with the spool 410 in the housing 402. The locking mechanism 500 is shown in the locked position where rotation is prevented to prevent cable 418 from uncoiling and/or coiling.

In an embodiment, the locking mechanism 500 may include an elongated bar 502 having a first end 504 that extends partly under the spool base plate 411 and a second end 506 that extends outward from under the spool base plate 411 and is hidden beneath the housing 402. The locking mechanism 500 may further include a lock catch 508 that is disposed on a bottom surface of the spool base plate 411 and positioned to engage the first end 504 of the elongated bar 502, when the elongated bar 502 is in the locked position. In an embodiment, the lock catch 508 may be a disc-shaped component, similar to a chainring toothed-gear on a bicycle. As such, the outer perimeter of the lock catch 508 may include one or more receptacles 510 (e.g., grooves, notches, slots, divots, depressions, etc.) surrounding the disc-shape thereof. The lock catch 508 may be disposed concentrically with the spool base plate 411. In an embodiment, as shown in FIG. 5, the lock catch 508 may be a separate component that is fastened to the spool base plate 411 via fasteners, such as the screws shown. Alternatively, the lock catch 508 may be formed integrally with the spool base plate 411.

In an embodiment, the first end 504 of the elongated bar 502 is shaped to engage in a receptacle 510 to prevent rotation of spool 410. As mentioned above, the tab 434 is slidably disposed and accessible within the housing 402. By sliding the tab 434, the elongated bar 502 slides forward and rearward, between the locked position and the unlocked position. Thus, FIG. 5 illustrates the tab 434 disposed in a locked position where the first end 504 engages one of the receptacles 510, to prevent rotation of the spool 410 relative to the housing 402.

When in an unlocked position (not shown in FIG. 5), the first end 504 is slid backward and thereby disengages the receptacle 510, to allow rotation of the spool 410 relative to the housing 402.

In an alternative embodiment (not shown), the locking mechanism 500 may include an elastomer, an elastomeric gasket, an elastomeric wedge, a ball bearing, a needle bearing, etc. that creates a relatively high amount of friction on the spool base plate 411. Alternatively (also not shown), the locking mechanism 500 may include a tension mechanism (e.g., a threaded cap) disposed above the second portion 414 (e.g., an upper portion) of the spool 410 that allows a user to adjust a tension of the spool 410. Moreover, in yet another alternative embodiment (also not shown), the locking mechanism 500 may include a displaceable pin that is removeably insertable into apertures disposed in the outer edge of the spool base plate 411. In still further embodiments (not shown), the locking mechanism 500 may include a rotatable disc-shaped component disposed in the front end 406 of the housing 402 of the cable module 400 that rotates into cooperating lock catches disposed in the outer edge of the spool base plate 411.

Figure 6A:
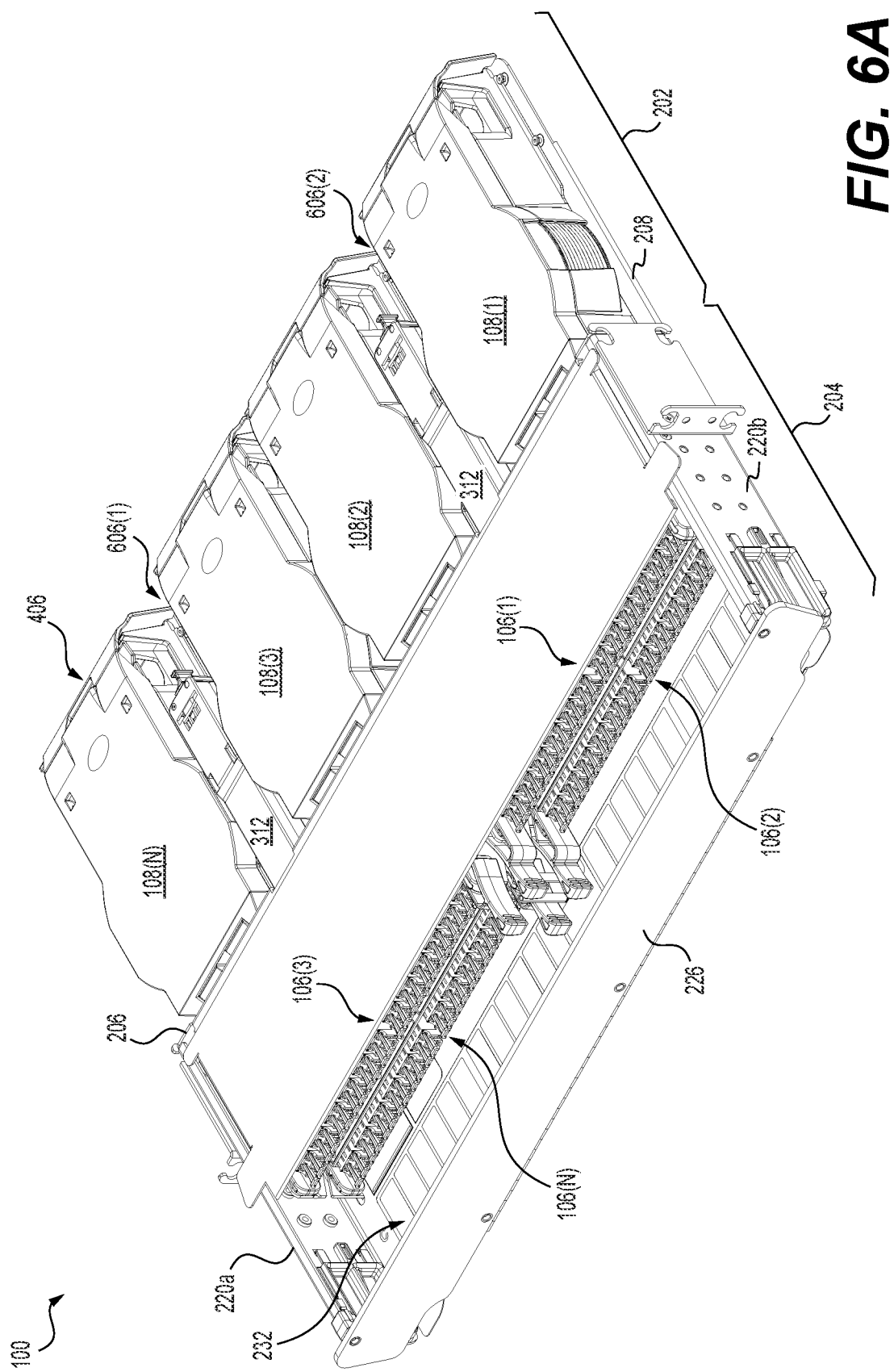
FIGS. 6A-B collectively illustrate a perspective view of the data communication apparatus of FIG. 1 with breakout modules removeably disposed in the chassis and the spool modules removeably disposed on the shelf according to an embodiment in this disclosure.
Figure 6B:
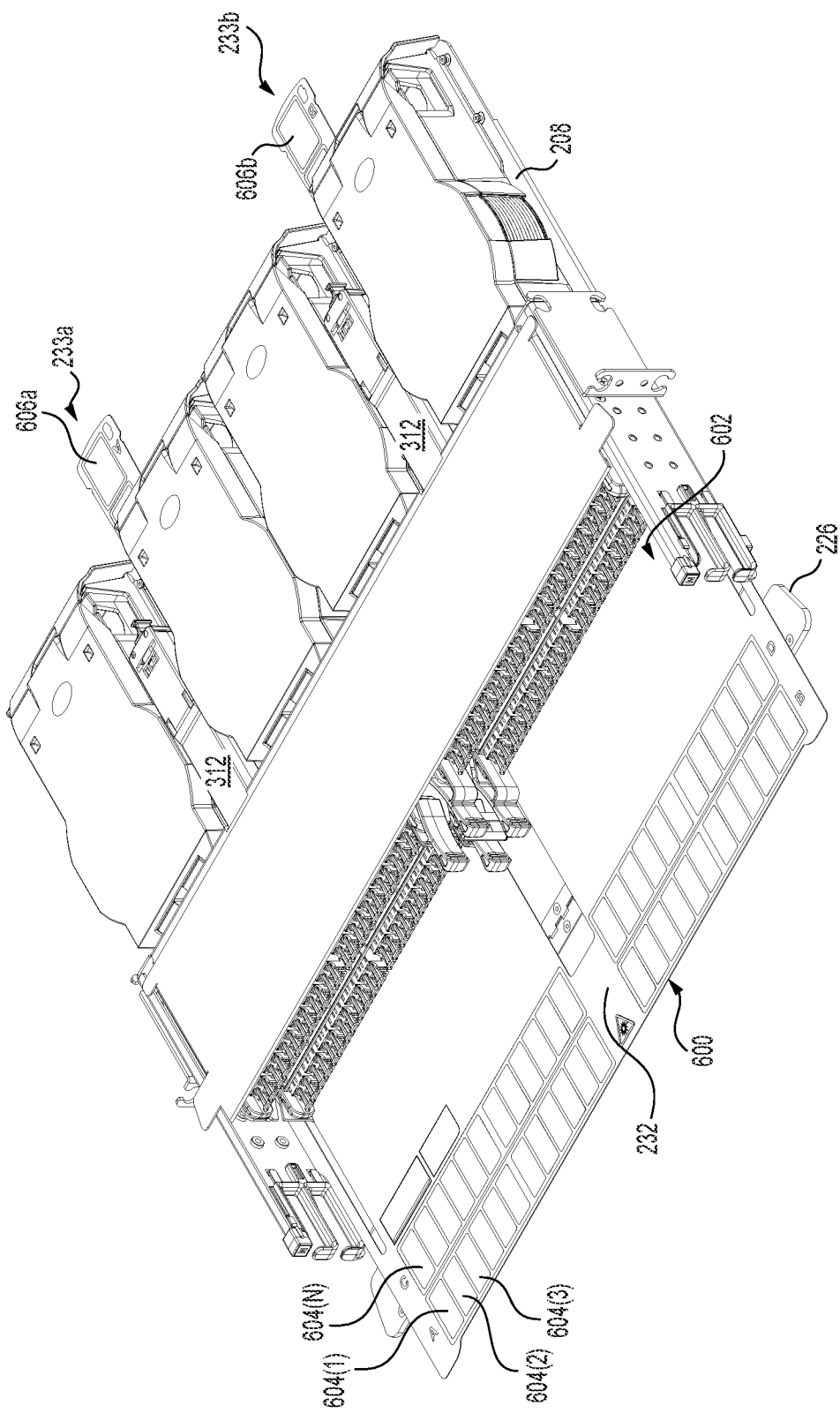

FIGS. 6A-B each illustrate a perspective view of the data communication apparatus 100 of FIG. 1 and depict the breakout modules 106(1)-106(N) disposed at the front access side 204 of the chassis 200. Moreover, the cable modules 108(1)-108(N) are shown as disposed on the shelf 208.

In an embodiment, the designation card 232 is disposed in the front access side 204, as discussed above. For the purpose of clarity in the description, the designation card 232 has a first end 600 opposite a second end 602.

In an embodiment, the designation card 232 may be slidably disposed at the front access side 204 of the chassis 200, below the breakout modules 106(1)-106(N). The designation card 232 may include writing surfaces 604(1), 604(2), 604(3), . . . , 610(N). The writing surfaces 604(1)-604(N) provide for tracking connection locations of the respective connectors 310(1)-310(N) of respective ones of the breakout modules 106(1)-106(N) housed in the chassis 200. Thus, a user (e.g., a technician) may write on the writing surfaces 604(1)-604(N) to help track a connection location. Further, the writing surfaces 604(1)-604(N) additionally and/or alternatively may have pre-printed material thereon.

As indicated above, the designation card 232 may be slidable and may thus be displaceable between a stowed position (see FIG. 6A) and a use position (see FIG. 6B). FIG. 6A illustrates that when the designation card 232 is in the stowed position, the first end 600 of the designation card 232 is located aligned with an outer edge of the bottom plate 224 such that the door 226 is closable. In contrast, FIG. 6B illustrates that when the designation card 232 is in the use position, the designation card 232 is pulled out of alignment with the bottom plate 224 to protrude partly off of the bottom plate 224 such that the writing surfaces 604(1)-604(N) are accessible. Additionally, the second end 602 of the designation card 232 may slide underneath the breakout modules 106(1)-106(N) for storage. Moreover, in an embodiment, the designation card 232 may have track grooves therein dispersed on the card to assist in sliding the designation card 232.

In an embodiment, the data communication apparatus 100 may further include the designation cards 233a, 233b, as mentioned above. The designation cards 233a, 233b may be slidably disposed on the surface 210 of the shelf 208 below the extension members 312 of the breakout modules 106 (1)-106(N) such that the designation cards 233a, 233b slide along the surface 210 of the shelf 208. The designation cards 233a, 233b may include respective writing surfaces 606a, 606b. The writing surfaces 606a, 606b provide for tracking connection locations of the respective first segments 416 of cables 418 of the cable modules 108(1)-108(N). Thus, a user (e.g., a technician) may write on the writing surfaces 606a, 606b to help track a connection location. Further, the writing surfaces 606a, 606b additionally and/or alternatively may have pre-printed material thereon.

As with designation card 232, FIG. 6A also illustrates that when the designation cards 233a, 233b are slidably displaced into the stowed position, the outer ends of the designation cards 233a, 233b are aligned with the edge of the shelf 208 (see also FIG. 2). In contrast, FIG. 6B illustrates that when the designation cards 233a, 233b are slidably displaced into the use position, the outer ends of the designation cards 233a, 233b protrudes beyond the edge of the shelf 208 such that the writing surfaces 606a, 606b are accessible.

Figure 7A:
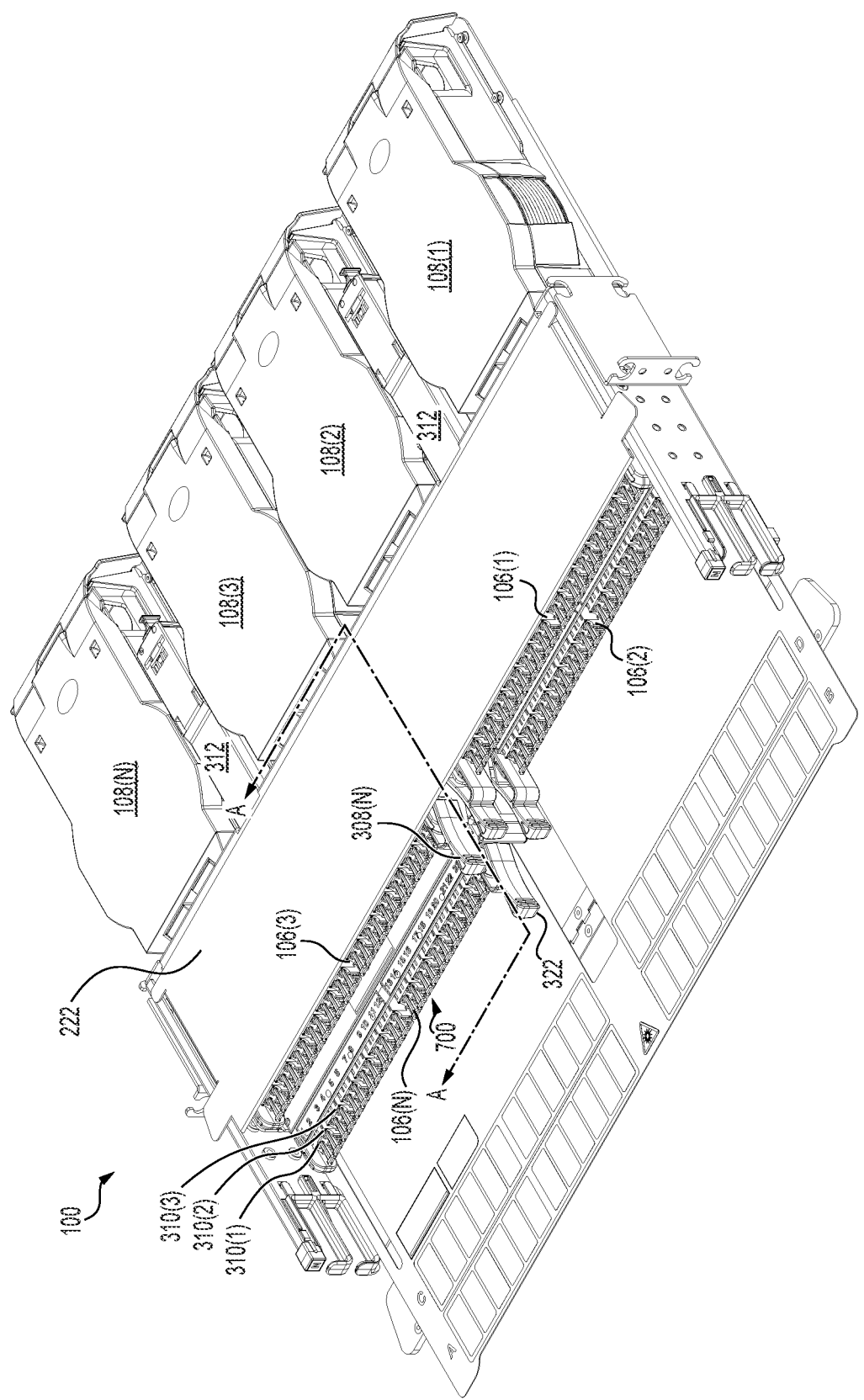
FIGS. 7A-B collectively illustrate a breakout module in an access position according to an embodiment in this disclosure.
Figure 7B:
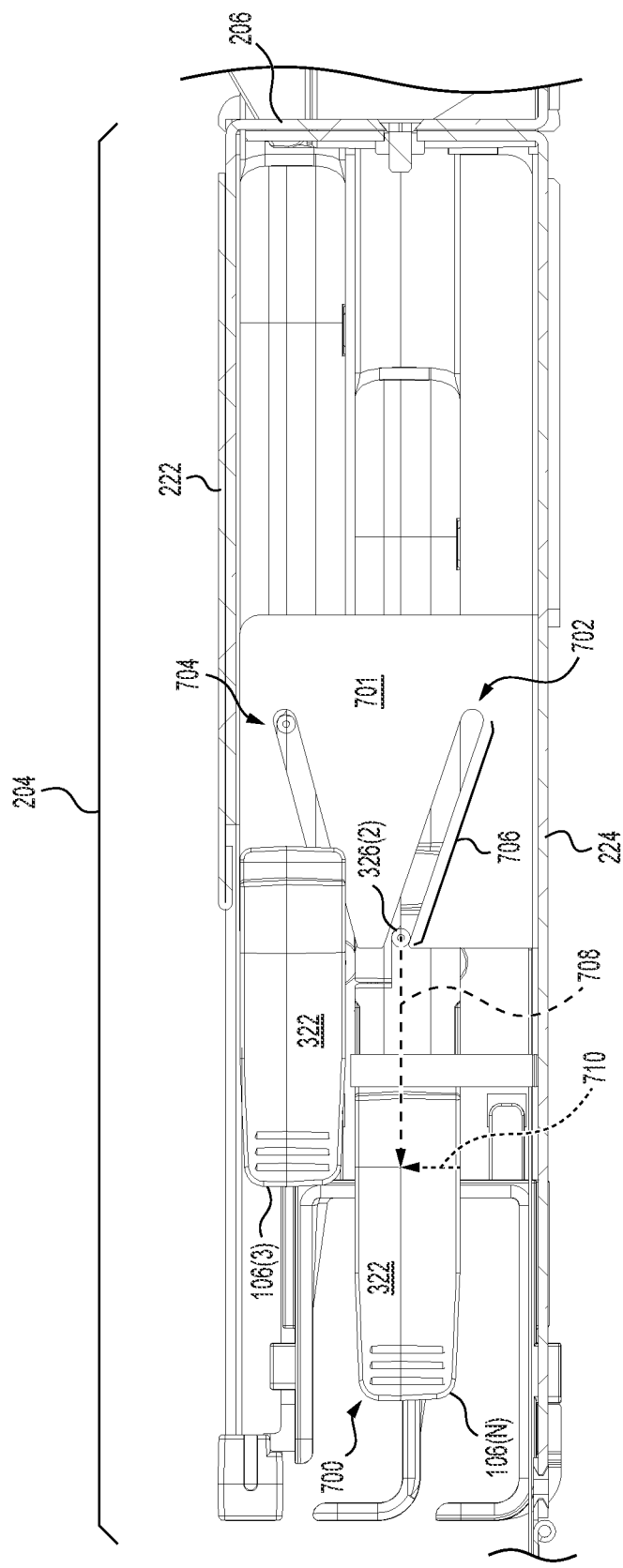

FIG. 7A illustrates the data communication apparatus 100 showing the breakout module 106(N) pulled forward in an access position 700. Additionally, FIG. 7A shows a section line A-A proximate to the middle of the data communication apparatus 100. FIG. 7B illustrates the data communication apparatus 100 from the perspective at line A-A, thereby showing a side profile of the breakout module 106(N) in the access position 700.

As seen in FIG. 7B, the chassis 200 may further include a guide plate 701 to guide the one or more breakout modules 106(1)-106(N) to and from an access position. In an embodiment, the guide plates 701 are supported, as shown in FIGS. 7B and 9, vertically extending between the top plate 222 and the bottom plate 224 on the front access side 204, to provide support for respective lateral sides of adjacent breakout modules when inserted into the pocket 230. For the sake of convenience, FIG. 7B is described with respect to a sole guide plate 701 that is visible from the side view at line A-A. Nevertheless, in an embodiment, multiple guide plates (like guide plate 701) may be incorporated in the chassis 200 to accommodate the apparatus 100 when more than one breakout module is inserted (see FIG. 9). Further, in an embodiment, two pairs of guide plates 701, as seen in FIG. 9, may be included to permit a user to place two breakout modules side by side. Alternatively, a single pair of guide plates 701 may support at least one breakout module, or as discussed further hereinafter, a single pair of guide plates 701 may support two vertically stacked breakout modules. In other words, a pair of two laterally-spaced guide plates 701 are used to secure a breakout module, by disposing a guide plate 701 at each side of a breakout module. Thus, in the embodiment depicted in FIG. 9, two breakout modules are able to be accommodated side by side between two spaced guide plates 701 by pairing one side of each breakout module to a guide plate 701; hence each breakout module is secured by a pair of guide plates 701. Additionally, the same two spaced guide plates 701 may also support two vertically stacked breakout modules. Accordingly, in an embodiment as shown, a chassis having four laterally spaced guide plates may accommodate a total of four breakout modules. However, it is understood that the above description is an example and not intended as a limitation. For example, in an embodiment not shown, the guide plates, chassis, etc. could be modified to extend farther laterally and/or vertically to accommodate more than four breakout modules. In yet another alternative embodiment not shown, the chassis and other components may be modified to reduce the number of guide plates. For example, a "guide" may be embodied directly integrally with the sidewalls.

Turning back to the FIG. 7B, the breakout module 106(N) is shown in the access position 700 and is thus positioned on a corresponding pair of first guides 702 (one of the pair is shown and the other is not visible as it is implied to be on the opposite side of the breakout module in a corresponding position) (see FIG. 9). Thus, opposing sides of the breakout module 106(N) are respectively supported and guided by a pair of first guides 702, which are configured to guide the breakout module 106(N) between the stowed position and the access position 700.

In an embodiment, the pair of first guides 702 may be disposed below a pair of second guides 704. The pair of first guides 702 may include a sloping ramp 706. Thus, the guide member 326(2) of the breakout module 106(N) may be positioned on one of the pair of first guides 702. Similarly, the guide member 326(1) of the breakout module 106(N) may be positioned on the other of the pair of first guides 702 disposed in the chassis 200 on the opposite side of the breakout module 106(N).

When the breakout module 106(N) is displaced into the stowed position, the first guides 702 guide the breakout module 106(N) into the chassis 200 such that the plurality of connectors 310(1)-310(N) disposed at the front end 306 of the breakout module 106(N) are in a retracted position that is closer to the rear wall 206 of the chassis 200, and thus in the pocket 230. That is, in the stowed position, a back end of the breakout module 106(N) may abut the rear wall 206. In contrast, when the breakout module 106(N) is displaced into the access position 700, the respective sloping ramps 706 of the first guides 702 guide the breakout module 106(N) out of the pocket 230 such that the connectors 310(1)-310(N) are displaced a horizontal distance 708 out away from the cover of the pocket 230 on the front access side 204 of the chassis 200. Moreover, in the access position 700, the connectors 310(1)-310(N) of the breakout module 106(N) are also displaced a vertical distance 710 (i.e., upward toward the second guides 704), to provide access to the connectors 310(1)-310(N). While FIGS. 7B, 8B, and 9 illustrate the pairs of first guides 702 and the pairs of second guides 704 as having a rectilinear shape, the pairs of first and/or second guides may be curvilinear, notched, stepped, etc.

FIG. 8A illustrates the data communication apparatus 100 showing the breakout module 106(3) pulled forward in an access position 800. Additionally, FIG. 8A shows a section line B-B proximate to the middle of the data communication apparatus 100. FIG. 8A illustrates the data communication apparatus 100 from the perspective at line B-B, thereby showing a side profile of the breakout module 106(3) in the access position 800. Further, the breakout module 106(3) is shown positioned on the corresponding pair of second guides 704. Similar to the first guides 702, the second guides 704 are configured to guide the breakout module 106(3) between a stowed position and the access position 800.

FIG. 8B illustrates the one of the second guides 704, showing that the second guides 704 may include a sloping ramp 802. Note, in an embodiment as depicted, the sloping ramps 706 and 802 may slope in opposite directions. In alternative embodiment not shown, the ramps may slope in the same direction or may be shaped differently entirely, though such changes would likely require additional modifications of other elements of the chassis 200. Thus, the guide member 326(2) of the breakout module 106(3) may be positioned on one of the pair of second guides 704. Similarly, the guide member 326(1) of the breakout module 106(3) may be positioned on the other of the pair of second guides 704 disposed in the chassis 200 on the opposite side of the breakout module 106(3).

When the breakout module 106(3) is displaced into the stowed position, the second guides 704 guide the breakout module 106(3) into the chassis 200 such that the plurality of connectors 310(1)-310(N) disposed at the front end 306 of the breakout module 106(3) in a retracted position that is closer to the rear wall 206 of the chassis 200, and thus in the pocket 230. That is, in the stowed position, a back end of the breakout module 106(3) may abut the rear wall 206. In contrast, when the breakout module 106(3) is displaced into the access position 800, the sloping ramps 802 of the second guides 704 guide the breakout module 106(3) out of the pocket 230 such that the connectors 310(1)-310(N) are displaced a horizontal distance 804 out away from the cover of the pocket 230 on the front access side 204 of the chassis 200. Moreover, in the access position 800, the connectors 310(1)-310(N) of the breakout module 106(3) are also displaced a vertical distance 806 (i.e., downward toward the first guides 702), to provide access to the connectors 310(1)-310(N).

FIG. 9 illustrates a perspective view of the chassis 200 and the shelf 208 from a direction opposite to that as shown in FIG. 2. As shown, the first guide plates 701 may be formed as bracket plates that are installed in place or may be integral with the bottom plate 224 or the top plate 222.

Additionally, the chassis 200 may include cable management members 900(1) and 900(2) that extend in line with the respective sidewalls 220*a*, 220*b* on the front access side 204 of the chassis 200 for managing cables such as optical fibers connected to the connectors 310(1)-310(N) of the breakout modules 106(1)-106(N) (not shown in FIG. 9). In an embodiment, the cable management members 900(1), 900(2) may include one or more horizontally extending slots 902, stacked vertically at a height of the sidewalls 220*a*, 220*b*. The cable management member 900(1) may manage cables connected to the connectors 310(1)-310(N) of the breakout modules 106(3) and 106(N), by allowing cables to pass laterally through the slots thereof. Likewise, the cable management member 900(2) may manage cables connected to the connectors 310(1)-310(N) of the breakout modules 106(1) and 106(2). While FIG. 9 illustrates the optical fiber management members 904(1) and 904(2) including slots 902, the optical fiber management members 904(1) and 904(2) may include gates, posts, ramps, troughs, apertures, etc.

Although the disclosed subject matter has been described in language specific to structural features and/or methodological acts, it is to be understood that the disclosed subject matter is not necessarily limited to the specific features or acts described. Rather, the specific features and acts are disclosed as illustrative forms of implementing the disclosed subject matter. For example, while embodiments are described having certain shapes, sizes, and configurations, these shapes, sizes, and configurations are merely illustrative.

What is claimed is:

1. A data communication apparatus comprising:
 a chassis having a front access side and a rear side, the chassis including a rear wall disposed at the rear side;
 a shelf having a surface extending from the rear wall at the rear side;
 a breakout module having a front end opposite a back end, the breakout module removeably disposable at least partially in the chassis, the breakout module including:
  a first adaptor disposed at the front end,
  an extension member extending from the back end, the extension member configured to extend through an opening located in the rear wall of the chassis, and
  a second adapter disposed in an end of the extension member;
 a cable module removeably disposable on the surface of the shelf such that the cable module is not disposed in the chassis, the cable module including:
  a housing having a front end opposite a back end,
  a spool rotatably disposed in the housing, the spool having a first portion and a second portion, the spool being configured to hold:
   a first segment of a fiber optic cable wound around the first portion to provide for feeding at least a portion of the first segment of the fiber optic cable out of the housing to a piece of telecommunication equipment, and
   a second segment of the fiber optic cable disposed with the second portion to provide strain relief for the fiber optic cable,
 wherein a first connector attached to an end of the first segment of the fiber optic cable is configured to connect to the piece of telecommunication equipment and, wherein a second connector attached to an end of the second segment of the fiber optic cable is configured to connect to the second adapter disposed in the end of the extension member.

2. The data communication apparatus of claim 1, wherein there is a magnetic connection between the breakout module and the rear wall.

3. The data communication apparatus of claim 2, wherein the magnetic connection includes:
 a magnet disposed at the rear wall, and
 a corresponding magnetic portion in the breakout module.

4. The data communication apparatus of claim 1, wherein the cable module further includes a locking mechanism to releasably prevent rotation of the spool.

5. The data communication apparatus of claim 1, wherein the chassis includes a guide to guide the breakout module between a stowed position and an access position.

6. The data communication apparatus of claim 1, wherein the shelf includes a guide member to align the cable module.

7. The data communication apparatus of claim 1, further comprising a designation card displaceably disposed at the front access side of the chassis below the breakout module, the designation card having a writing surface for writing on by a user, and the designation card being displaceable between a stowed position and a use position.

8. The data communication apparatus of claim 1, further comprising a designation card displaceably disposed on the surface of the shelf, the designation card having a writing surface for writing on by a user, and the designation card being displaceable between a stowed position and a use position.

9. The data communication apparatus of claim 1, wherein the second adapter disposed in the end of the extension member of the breakout module includes an MPO adapter.

10. The data communication apparatus of claim 1, wherein the first adaptor disposed in the front end of the breakout module includes an LC connector or an SC connector.

11. A data communication apparatus comprising:
 a chassis including:
  a front access side having a pocket,
  a rear side,
  a rear wall that extends across the rear side, and
  a shelf having a surface extending from the rear wall at the rear side;
 a breakout module removeably disposable at least partially in the pocket of the front access side of the chassis; and
 a cable module removeably disposable on the surface of the shelf such that the cable module is not disposed in the chassis, the cable module including:
  a housing, and
  a spool rotatably disposed in the housing, the spool having a first portion and a second portion, the spool being configured to hold:
   a first segment of a fiber optic cable wound around the first portion, and
   a second segment of the fiber optic cable disposed with the second portion to provide strain relief for the fiber optic cable.

12. The data communication apparatus of claim 11, wherein, when the breakout module is removeably disposed at least partially in through the rear wall.

13. The data communication apparatus of claim 12, wherein the breakout module includes an extension member and a protruding flange attached to the extension member, the protruding flange preventing unintentional removal from the chassis.

14. The data communication apparatus of claim 13, wherein the protruding flange is resilient such that the flange flexes toward the extension member to pass through an aperture in the rear wall, and upon passing through the aperture, the flange flexes away from the extension member.

15. The data communication apparatus of claim 11, wherein the chassis further includes a guide disposed to guide the breakout module between a stowed position and an access position,
- wherein the breakout module is a first breakout module, and the guide is a first guide, and
- wherein the data communication apparatus further comprises a second breakout module and a second guide to guide the second breakout module between the stowed position and the access position, in a location adjacent to the first breakout module.

16. The data communication apparatus of claim 11, wherein the front access side of the chassis further includes opposing sidewalls that extend in a direction opposite the shelf,
- wherein the chassis further includes cable management members that extend respectively from the opposing sidewalls, and
- wherein the cable management members include horizontally extending slots through which fiber optic cables may pass.

17. A data communication apparatus comprising:
a chassis including:
- a front access side,
- a rear side,
- a rear wall extending across the rear side, the rear wall including an aperture extending therethrough, and
- a shelf having a surface extending from the rear wall at the rear side away from the front access side;

a breakout module having a front end opposite a back end, the breakout module removeably disposable at least partially in the chassis, the breakout module including:
- a first adaptor disposed at the front end,
- an extension member extending from the back end of the breakout module, and
- a second adapter disposed in an end of the extension member of the back end,
- wherein when the breakout module is removeably disposed at least partially in the chassis, the extension member passes through the aperture;

a cable module removeably disposable on the surface of the shelf such that the cable module is not disposed in the chassis, the cable module including a spool configured to hold a fiber optic cable.

18. The data communication apparatus of claim 17, further comprising:
a magnetic connection to couple the breakout module and the cable module to the rear wall.

19. The data communication apparatus of claim 17, wherein the chassis further includes a door connected hingedly to a front of the front access side.

20. The data communication apparatus of claim 17, wherein the breakout module and the cable module releasably connect to the rear wall.

* * * * *